United States Patent
Mu

(10) Patent No.: US 11,791,945 B2
(45) Date of Patent: Oct. 17, 2023

(54) HYBRID AUTOMATIC REPEAT REQUEST (HARQ) FEEDBACK METHOD AND APPARATUS

(71) Applicant: Beijing Xiaomi Mobile Software Co., Ltd., Beijing (CN)

(72) Inventor: Qin Mu, Beijing (CN)

(73) Assignee: Beijing Xiaomi Mobile Software Co., Ltd., Beijing (CN)

( * ) Notice: Subject to any disclaimer, the term of this patent is extended or adjusted under 35 U.S.C. 154(b) by 488 days.

(21) Appl. No.: 17/266,679

(22) PCT Filed: Aug. 8, 2018

(86) PCT No.: PCT/CN2018/099450
§ 371 (c)(1),
(2) Date: Feb. 8, 2021

(87) PCT Pub. No.: WO2020/029130
PCT Pub. Date: Feb. 13, 2020

(65) Prior Publication Data
US 2021/0306105 A1  Sep. 30, 2021

(51) Int. Cl.
*H04L 1/1812* (2023.01)
*H04W 72/1268* (2023.01)

(52) U.S. Cl.
CPC ....... *H04L 1/1812* (2013.01); *H04W 72/1268* (2013.01)

(58) Field of Classification Search
None
See application file for complete search history.

(56) References Cited

U.S. PATENT DOCUMENTS

| 2013/0176920 A1 | 7/2013 | Seo et al. |
| 2017/0230962 A1* | 8/2017 | Park ................ H04L 1/1861 |
| 2018/0279363 A1* | 9/2018 | Su ................ H04W 74/0833 |

FOREIGN PATENT DOCUMENTS

| CN | 103891182 A | 6/2014 |
| WO | WO 2018030379 A1 | 2/2018 |

OTHER PUBLICATIONS

Examination Report for Indian Application No. 202147009478, dated Feb. 22, 2022.

(Continued)

*Primary Examiner* — Anh Ngoc M Nguyen
(74) *Attorney, Agent, or Firm* — Finnegan, Henderson, Farabow, Garrett & Dunner, L.L.P.

(57) ABSTRACT

A hybrid automatic repeat request (HARQ) feedback method includes: determining a plurality of target HARQ results, the plurality of target HARQ results being the HARQ results corresponding respectively to a plurality of target physical downlink shared channels (PDSCHs), the plurality of target PDSCHs being a plurality of PDSCHs scheduled by a current physical downlink control channel (PDCCH); based on the plurality of target HARQ results, determining a combined HARQ result, the combined HARQ result being used for representing the plurality of target HARQ results; determining a target narrowband physical uplink shared channel (NPUSCH), the target NPUSCH being an NPUSCH with a target resource carrying the combined HARQ result; carrying the combined HARQ result by the target resource, and sending the target NPUSCH to a base station.

23 Claims, 16 Drawing Sheets

(56) References Cited

OTHER PUBLICATIONS

English version of Search Report and Written Opinion of the International Searching Authority Issued in Application No. PCT/CN2018/099450, dated Apr. 16, 2019.
Extended European Search Report in Application No. 18929626.2, dated Jul. 15, 2021.

\* cited by examiner

HYBRID AUTOMATIC REPEAT REQUEST (HARQ) FEEDBACK METHOD AND APPARATUS

CROSS REFERENCE TO RELATED APPLICATIONS

This application is a national phase application based on International Application No. PCT/CN2018/099450, filed Aug. 8, 2018, the content of which is incorporated herein by reference.

TECHNICAL FIELD

The present disclosure relates to a field of communication technologies, and more particularly, to a hybrid automatic repeat request (HARQ) feedback method and apparatus.

BACKGROUND

Recently, popularization of Internet of Things (IoT) brings great convenience to life and work. Narrow Band Internet of Things (NB-IoT) technologies are typical cellular IoT technologies.

Basic framework of NB-IoT is formed in release 13 of Long Term Evolution (LTE). Similar to traditional LTE scheduling, one Physical Downlink Control Channel (PDCCH) in the NB-IoT schedules one Physical Downlink Shared Channel (PDSCH) or one Physical Uplink Shared Channel (PUSCH). The NB-IoT device needs to receive and blindly check PDCCH before receiving or sending data. When the NB-IoT device sends or receive a large data packet, the sending or receiving process is completed after several rounds of scheduling. In most cases, due to similar channel conditions, contents of several scheduled PDCCHs are similar. In this case, a user still needs to demodulate the scheduled PDCCH for each scheduling, which is power-consuming.

In order to avoid power consumption in the above situations, the 3rd Generation Partnership Project (3GPP) in Release 16 has proposed that in the NB-IoT system, one PDCCH may continuously schedule a plurality of PDSCHs.

In the current NB-IoT system, HARQ feedback mechanism is the same as that of the traditional LTE. For HARQ result of each PDSCH, only one NPUSCH is required for feedback, as shown in FIG. 1. However, excessive NPUSCHs are consumed, which prolongs feedback duration of the device and is not conducive to power saving.

SUMMARY

According to a first aspect of embodiments of the present disclosure, a HARQ feedback method is provided. The method is applied to a NB-IoT device. The method includes:
  determining a plurality of target HARQ results, in which the plurality of target HARQ results are HARQ results corresponding to a plurality of target physical downlink shared channels (PDSCHs), and the plurality of target PDSCHs are PDSCHs scheduled by a current physical downlink control channel (PDCCH);
  determining a combined HARQ result based on the plurality of target HARQ results, in which the combined HARQ result is used for representing the plurality of target HARQ results;
  determining a target narrowband physical uplink shared channel (NPUSCH), in which the target NPUSCH is a NPUSCH with a target resource carrying the combined HARQ result; and
  carrying the combined HARQ result by the target resource and sending the target NPUSCH to a base station.

According to a second aspect of embodiments of the present disclosure, a HARQ feedback method is provided. The method is applied to a NB-IoT device. The method includes:
  determining a plurality of target HARQ results, in which the plurality of target HARQ results are HARQ results corresponding to a plurality of target physical downlink shared channels (PDSCHs), and the plurality of target PDSCHs are PDSCHs scheduled by a current physical downlink control channel (PDCCH);
  determining a combined HARQ result and a target narrowband physical uplink shared channel (NPUSCH) in a plurality of candidate NPUSCHs based on the plurality of target HARQ results, in which the target NPUSCH is a NPUSCH with a target resource carrying the combined HARQ result, and the combined HARQ result and the target resource are used for representing the plurality of target HARQ results; and
  carrying the combined HARQ result by the target resource and sending the target NPUSCH to a base station.

According to a third aspect of embodiments of the present disclosure, a HARQ feedback apparatus is provided. The apparatus is used in a NB-IoT device. The apparatus includes:
  a processor and
  a memory configured to store instructions executable by the processor.
  The processor is configured to:
  determine a plurality of target HARQ results, in which the plurality of target HARQ results are HARQ results corresponding to a plurality of target physical downlink shared channels (PDSCHs), and the plurality of target PDSCHs are PDSCHs scheduled by a current physical downlink control channel (PDCCH);
  determine a combined HARQ result based on the plurality of target HARQ results, in which the combined HARQ result is used for representing the plurality of target HARQ results;
  determine a target narrowband physical uplink shared channel NPUSCH, in which the target NPUSCH is a NPUSCH with a target resource carrying the combined HARQ result; and
  carry the combined HARQ result by the target resource and send the target NPUSCH to a base station.

According to a fourth aspect of embodiments of the present disclosure, a HARQ feedback apparatus is provided. The apparatus is used in a NB-IoT device. The apparatus includes:
  a processor and
  a memory configured to store instructions executable by the processor.
  The processor is configured to:
  determine a plurality of target HARQ results, in which the plurality of target HARQ results are HARQ results corresponding to a plurality of target physical downlink shared channels (PDSCHs), and the plurality of target PDSCHs are PDSCHs scheduled by a current physical downlink control channel (PDCCH);
  determine a combined HARQ result and a target narrowband physical uplink shared channel NPUSCH in a plurality of candidate NPUSCHs based on the plurality of target HARQ results, in which the target NPUSCH is a NPUSCH with a target resource carrying the combined HARQ result, and the combined HARQ result and the target resource are used for representing the plurality of target HARQ results; and carry the combined HARQ result by the target resource and send the target NPUSCH to a base station.

It is to be understood that both the foregoing general description and the following detailed description are exemplary and explanatory only and are not restrictive of the present disclosure, as claimed.

BRIEF DESCRIPTION OF THE DRAWINGS

The accompanying drawings, which are incorporated in and constitute a part of this specification, illustrate embodiments consistent with the present disclosure and, together with the description, serve to explain the principles of the present disclosure.

DETAILED DESCRIPTION

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the present disclosure. Instead, they are merely examples of apparatuses and methods consistent with aspects related to the present disclosure as recited in the appended claims.

The terms used in the present disclosure are only for the purpose of describing specific embodiments, and are not intended to limit the present disclosure. The terms "a", "said" and "the" in the singular form used in the present disclosure and appended claims are also intended to include the terms in the plural form, unless specified otherwise. It is understood that the term "and/or" used herein refers to and may include any or all possible combinations of one or more associated listed items.

It is understood that although terms such as "first", "second" and "third" may be used in this disclosure to describe various information, the information should not be limited to these terms. These terms are only used to distinguish the same type of information from each other. For example, without departing from the scope of the present disclosure, the first information may also be referred to as the second information, and similarly, the second information may also be referred to as the first information. Depending on the context, the character "if" as used herein may be interpreted as "when", "while" or "in response to determining".

Figure 1:
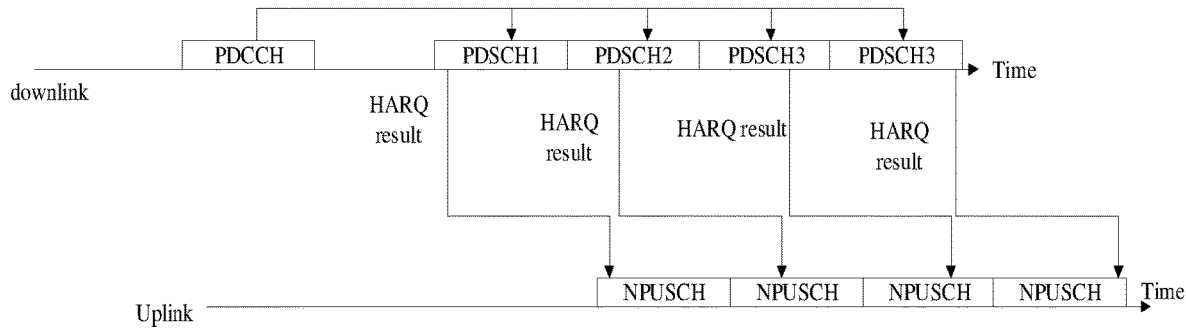
FIG. 1 is a schematic diagram of an existing hybrid automatic repeat request (HARQ) feedback scene according to an exemplary embodiment.
Figure 2:
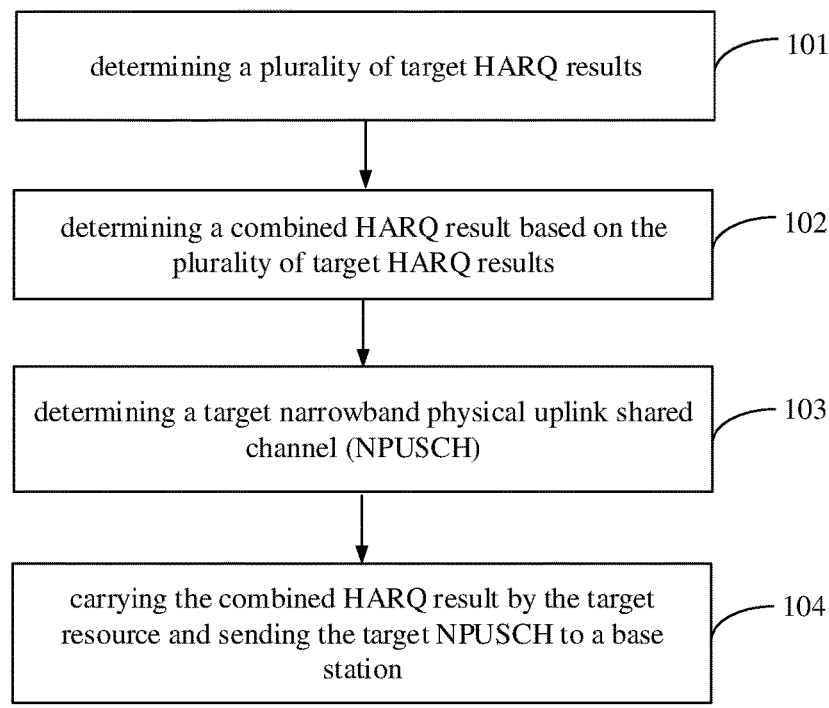
FIG. 2 is a flowchart of a HARQ feedback method according to an exemplary embodiment.

Embodiments of the present disclosure provide a hybrid automatic repeat request (HARQ) feedback method. The method may be applied to a Narrow Band Internet of Things (NB-IoT) device, such as intelligent meter reading used in smart cities, shared bicycles in smart transportation, and temperature and humidity collection devices in smart agriculture. FIG. 2 is a flowchart of a HARQ feedback method according to an exemplary embodiment. As illustrated in FIG. 2, the method may include the following steps.

At step 101, a plurality of target HARQ results are determined, in which the plurality of target HARQ results are HARQ results corresponding to a plurality of target physical downlink shared channels (PDSCHs), and the plurality of target PDSCHs are PDSCHs scheduled by a current physical downlink control channel (PDCCH).

At step 102, a combined HARQ result is determined based on the plurality of target HARQ results, in which the combined HARQ result is used for representing the plurality of target HARQ results.

At step 103, a target narrowband physical uplink shared channel (NPUSCH) is determined, in which the target NPUSCH is a NPUSCH with a corresponding target resource carrying the combined HARQ result.

At step 104, the combined HARQ result is carried by the target resource and the target NPUSCH is sent to a base station.

In this embodiment, the plurality of target HARQ results may be represented by one combined HARQ result, which improves the efficiency of HARQ feedback in the NB-IoT system and reduces consumption of NPUSCH resource, and is conductive to saving power of the NB-IoT device.

At step 101, in the NB-IoT system, the current PDCCH may schedule a plurality of consecutive PDSCHs at the same time, and the NB-IoT device may respectively determine the HARQ result corresponding to each PDSCH based on technologies in the related art.

Optionally, the HARQ result corresponding to each PDSCH may be ACKnowledgement (ACK) or Negative ACKnowledgment (NACK).

At step 102, the NB-IoT device may adopt any one of the following solutions to determine the combined HARQ result based on the plurality of target HARQ results.

In the first solution, a logical AND operation is performed on binary values corresponding to the plurality of target HARQ results to obtain an operation result, and the operation result is determined as the combined HARQ result.

Figure 3:
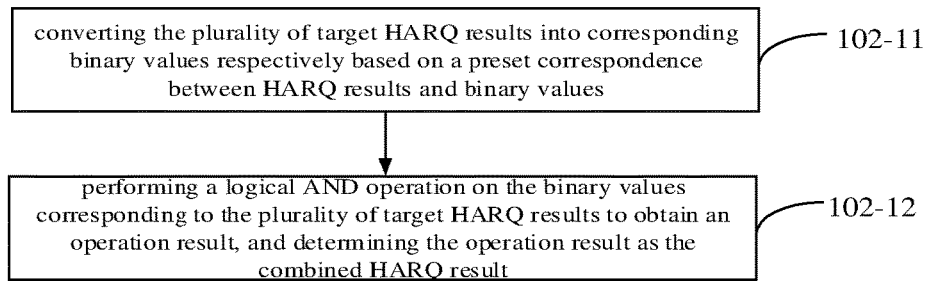
FIG. 3 is a flowchart of another HARQ feedback method according to an exemplary embodiment.

Optionally, referring to FIG. 3, which is a flowchart of another HARQ feedback method according to the embodiment shown in FIG. 2, step 102 may include the following steps.

At step 102-11, the plurality of target HARQ results are converted into binary values based on a preset correspondence between HARQ results and binary values.

In this step, the NB-IoT device may set the correspondence between HARQ results and binary values in advance, as shown in Table 1.

TABLE 1

| HARQ results | Binary Values |
| --- | --- |
| NACK | 0 |
| ACK | 1 |

The NB-IOT device may convert the plurality of target HARQ results into corresponding binary values respectively according to Table 1. For example, the target HARQ results ACK, NACK, NACK, ACK are converted into binary values 1, 0, 0, 1 correspondingly.

At step 102-12, a logical AND operation is performed on the binary values corresponding to the plurality of target HARQ results to obtain an operation result, and the operation result is determined as the combined HARQ result.

In this step, the NB-IoT device may perform the logical AND operation uniformly on the binary values corresponding to the plurality of target HARQ results determined at step 102-11, and determine the operation result as the combined HARQ result.

Figure 4:
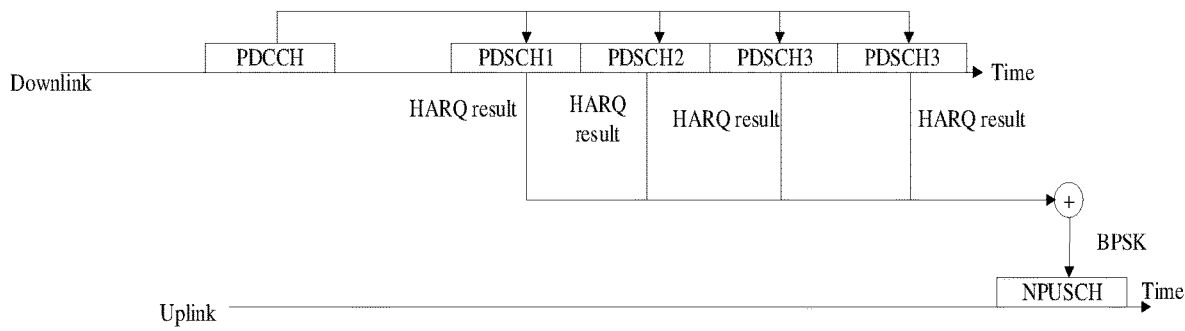
FIG. 4 is a schematic diagram of another HARQ feedback scene according to an exemplary embodiment.

For example, as illustrated in FIG. 4, the binary values corresponding to the plurality of target HARQ results are: 1, 0, 0, and 1, and after the logical AND operation is completed, the operation result is 0, that is, the combined HARQ result is 0.

In embodiments of the present disclosure, the combined HARQ result is 1 only when the plurality of target HARQ results are all 1, otherwise the combined HARQ result is 0. If the base station receives the combined HARQ result as 1, it means that the NB-IoT device has successfully received all of the target PDSCHs scheduled by the current PDCCH, otherwise, it means that the NB-IoT device has not successfully received all of the target PDSCHs scheduled by the current PDCCH.

In the above embodiment, the NB-IoT device performs the logical AND operation on the binary values corresponding to the plurality of target HARQ results, and finally determines the operation result as the combined HARQ result, so that for the purpose of representing the plurality of target HARQ results by one combined HARQ result is achieved, the availability of which is high.

In the second solution, the logical AND operation is performed on the binary values corresponding to target HARQ results in each group of target HARQ results to obtain the operation result, and the operation result is determined as the combined HARQ result corresponding to the current group of target HARQ results.

Figure 5:
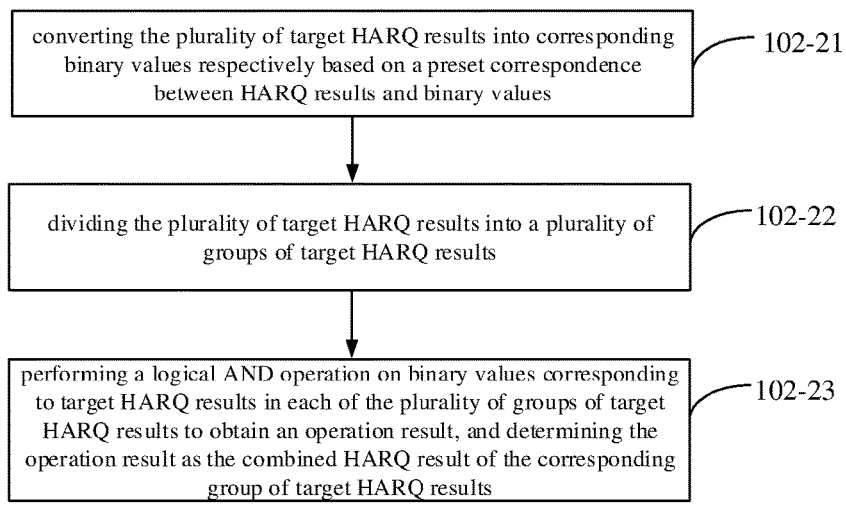
FIG. 5 is a flowchart of another HARQ feedback method according to an exemplary embodiment.

Optionally, referring to FIG. 5, which is a flowchart of another HARQ feedback method according to the embodiment shown in FIG. 2, step 102 may include the following steps.

At step 102-21, the plurality of target HARQ results are converted into binary values based on a preset correspondence between HARQ results and binary values.

This process is implemented in the same manner as step 102-11, which is not repeated here.

At step 102-22, the plurality of target HARQ results are divided into a plurality of groups of target HARQ results.

In this step, since a number of the target HARQ results is large, the plurality of target HARQ results are divided into a plurality of groups of target HARQ results.

For example, when a total number of the target HARQ results is 4, the target HARQ results is evenly divided into two groups of target HARQ results, and each group includes 2 target HARQ results.

At step 102-23, a logical AND operation is performed on the binary values corresponding to the target HARQ results in each of the plurality of groups of target HARQ results to obtain an operation result, and the operation result is determined as the combined HARQ result of the current group of target HARQ results.

Figure 6:
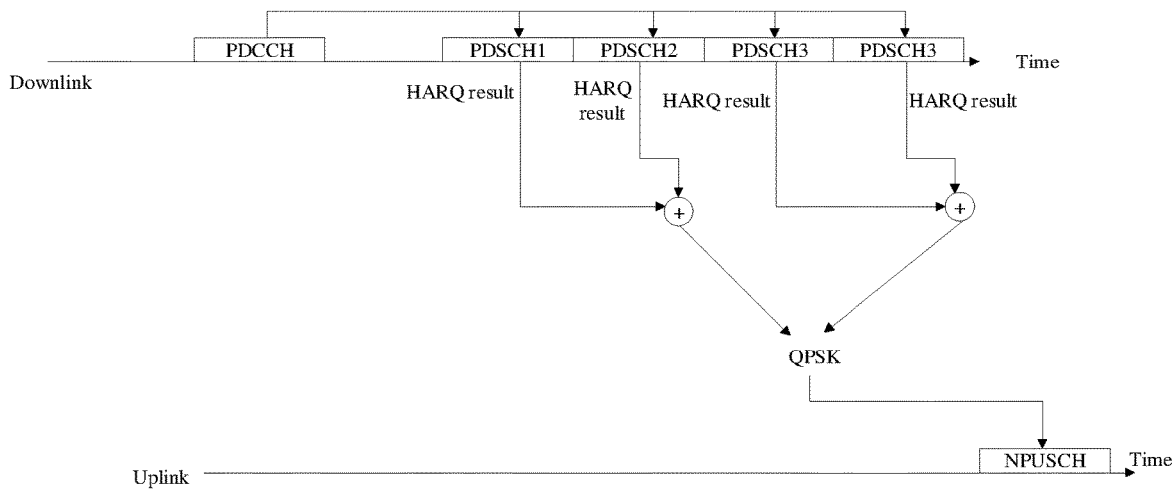
FIG. 6 is a schematic diagram of another HARQ feedback scene according to an exemplary embodiment.

For example, as illustrated in FIG. 6, assuming that the binary values corresponding to the plurality of target HARQ results are: 1, 0, 1, 1, and the results are divided into 2 groups, then the binary values corresponding to the target HARQ results included in group 1 of target HARQ results are 1 and 0, and the binary values corresponding to the target HARQ results included in group 2 of target HARQ results are 1 and 1. After performing the logical AND operation on each group of target HARQ results, the operation result corresponding to group 1 of target HARQ results is 0, that is, the combined HARQ result corresponding to group 1 is 0, and the operation result corresponding to group 2 is 1, that is, the combined HARQ result of group 2 is 1.

In embodiments of the present disclosure, when the base station receives the combined HARQ result corresponding to group 1as 0, it means that the NB-IoT device has not successfully received the first 2 target PDSCHs scheduled by the current PDCCH, and when the base station side receives the combined HARQ result corresponding to group 2 as 1, it means that the NB-IoT device has successfully received the last two target PDSCHs scheduled by the current PDCCH.

In the above embodiment, the NB-IoT device may divide the plurality of target HARQ results into groups to determine the combined HARQ result corresponding to each group, which has high availability.

At step 103, the target NPUSCH is a NPUSCH with its own resource used for carrying the HARQ results, and the target resource is a time and frequency domain resource used by the target NPUSCH in the NB-IoT system.

The NB-IoT device may use any of the following solutions to determine the target NPUSCH, in which, the NPUSCH in the format 2 is used in embodiments of the present disclosure.

In the first solution, a NPUSCH indicated by the target index value is determined as the target NPUSCH.

Figure 7:
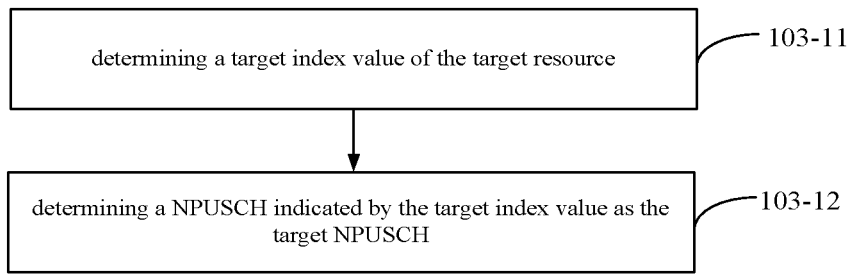
FIG. 7 is a flowchart of another HARQ feedback method according to an exemplary embodiment.
Figure 8:
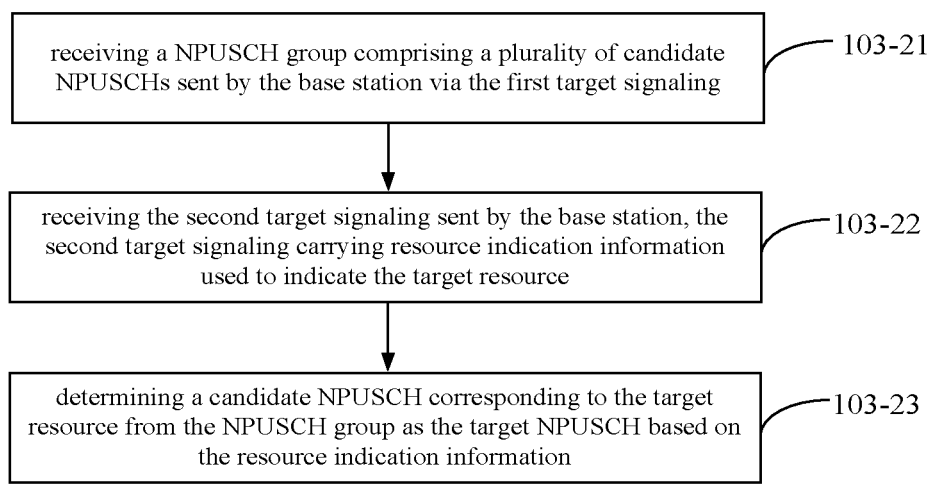
FIG. 8 is a flowchart of another HARQ feedback method according to an exemplary embodiment.

Optionally, as illustrated in FIG. 7, which is a flowchart of another HARQ feedback method according to the embodiment shown in FIG. 2, step 103 may include the following steps.

At step 103-11, a target index value of the target resource is determined.

In this process, the target index value may be determined according to the frequency value corresponding to a preset subcarrier and a first target offset. Optionally, a sum of the frequency value corresponding to the preset subcarrier and the first target offset may be determined as the target index value. Certainly, other calculation methods may be used to calculate the target index value according to the frequency value corresponding to the preset subcarrier and the first target offset, which belongs to the protection scope of the present disclosure.

The preset subcarrier is a subcarrier at a starting frequency domain location of a NPUSCH used to carry the HARQ result. For example, the NB-IoT device has frequency domain resource for 50 NPUSCHs, but from the frequency domain location corresponding to the 25th NPUSCH, the resource for NPUSCHs can be used to carry the HARQ results, then the frequency value corresponding to the preset subcarrier is the frequency value corresponding to the 25th subcarrier.

In embodiments of the present disclosure, the base station may send the starting frequency domain location to the NB-IoT device via a first target signaling, such as RRC signaling.

The first target offset is an offset in a frequency domain where a NPUSCH resource used for feeding back the HARQ results is located. Optionally, the base station may configure the NB-IoT device via a second target signaling, for example, DCI signaling.

At this step, the NB-IoT device may calculate the target index value F_NPUSCH format 2 according to the following formula 1.

$$F\_NPUSCH\ format\ 2 = f0 + f\_n,\qquad \text{formula 1}$$

f0 is the frequency value corresponding to the preset subcarrier, and f_n is the first target offset.

At step 103-12, the NPUSCH indicated by the target index value is the target NPUSCH.

At this step, the NB-IoT device directly determines the NPUSCH at the frequency domain location indicated by the target index value as the target NPUSCH according to technologies in the related art.

In the above embodiment, the NB-IoT device may first determine the target index value corresponding to the target resource. Optionally, the target index may be determined according to the frequency value corresponding to the preset subcarrier and the first target offset. The NB-IoT device determines the NPUSCH indicated by the target index value as the target NPUSCH. In the above process, the target NPUSCH could be rapidly determined, which facilitates carrying the combined HARQ result by the target resource corresponding to the target NPUSCH.

In a second solution, one target NPUSCH is determined from a NPUSCH group including a plurality of candidate NPUSCHs.

Optionally, referring to 8, which is a flowchart of another HARQ feedback method according to the embodiment shown in FIG. 2, step 103 may include the following steps.

At step 103-21, a NPUSCH group including a plurality of candidate NPUSCHs sent by the base station through the first target signaling is received.

At this step, the first target signaling may be a RRC signaling. The base station sends the NPUSCH group to the NB-IoT device via the RRC signaling. The NPUSCH group includes a plurality of candidate NPUSCHs. For example, the NPUSCH group may be {F1_NPUSCH format 2, F2_NPUSCH format 2, F3_NPUSCH format 2, F4_NPUSCH format 2}.

At step 103-22, the second target signaling sent by the base station is received, in which the second target signaling carries resource indication information used to indicate the target resource.

At this step, the NB-IoT device may also receive the second target signaling sent by the base station, in which the second target signaling carries resource indication information used to indicate the target resource. Optionally, the second target signaling may be a DCI signaling.

At step 103-23, a candidate NPUSCH corresponding to the target resource is selected from the NPUSCH group and determined as the target NPUSCH based on the resource indication information.

At this step, the base station may determine the target NPUSCH in the NPUSCH group according to previous resource indication information. For example, if the target resource indicated by the resource indication information carried in the DCI signaling sent by the base station is a frequency domain resource, which corresponds to F1_NPUSCH format 2, the NB-IoT device determines F1_NPUSCH format 2 as the target NPUSCH.

In the above embodiment, the NB-IoT device may rapidly determine the target NPUSCH according to the signaling sent by the base station, which is easy to implement and has high availability.

At step 104, optionally, the NB-IoT device may carry the combined HARQ result by the target resource corresponding to the target NPUSCH based on technologies in the related art, and send the target NPUSCH in the preset format in the related art to the base station.

If the NB-IoT device performs the logical AND operation on the binary values corresponding to the plurality of target HARQ results, and determines the operation result as the combined HARQ result, then BPSK modulation could be performed on the combined HARQ result according to technologies in the related art, and further the target NPUSCH is sent to the base station in the preset format corresponding to NPUSCH format 2.

If the NB-IOT device performs the logical AND operation on the binary values included in each group of target HARQ results, and determines the operation result as the combined HARQ result corresponding to the current group of target HARQ results, then QPSK modulation may be performed on the combined HARQ results corresponding to all groups of target HARQ results according to technologies in the related art, and further the target NPUSCH is sent to the base station in the preset format corresponding to NPUSCH format 2.

In the above embodiment, when the NB-IoT device carries the combined HARQ result by the target resource and sends the target NPUSCH to the base station, optionally, it may send the target NPUSCH in the preset format, which is easy to implement and improves the efficiency of HARQ feedback in the NB-IoT system.

Figure 9:
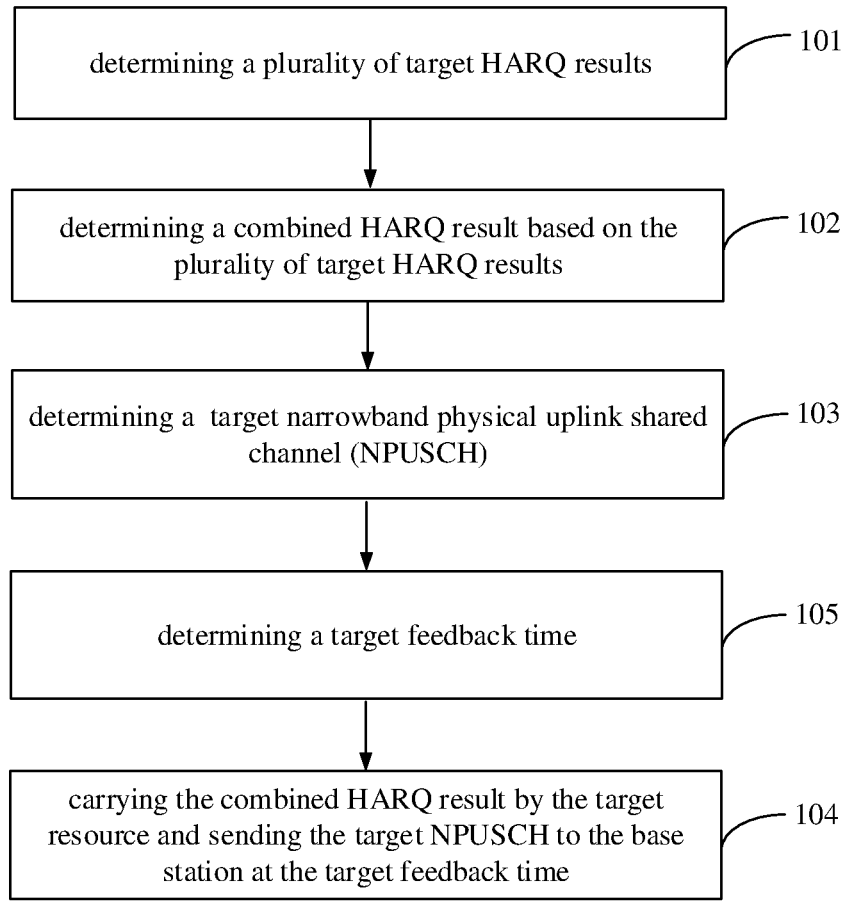
FIG. 9 is a flowchart of another HARQ feedback method according to an exemplary embodiment.

In an embodiment, as illustrated in FIG. 9, which is a flowchart of another HARQ feedback method according to the embodiment shown in FIG. 2, the method may further include the following steps.

At step 105, a target feedback time is determined.

At this step, the NB-IoT device may determine the time at which the combined HARQ result needs to be fed back.

Correspondingly, step 104 may include:

carrying the combined HARQ result by the target resource and sending the target NPUSCH to the base station at the target feedback time.

In other words, the combined HARQ result may be carried by the target resource corresponding to the target NPUSCH and the target NPUSCH may be sent to the base station at the target feedback time.

Figure 10:
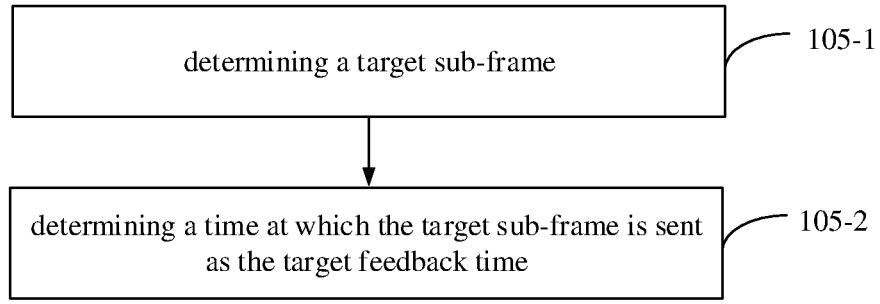
FIG. 10 is a flowchart of another HARQ feedback method according to an exemplary embodiment.

In the above embodiment, as illustrated in FIG. 10, which is a flowchart of another HARQ feedback method according to the embodiment shown in FIG. 9, step 105 may include the following steps.

At step 105-1, a target sub-frame is determined, in which the target sub-frame is a first valid sub-frame spaced from a candidate sub-frame by a specified number of sub-frames, and the candidate sub-frame is a sub-frame where a last PDSCH of the plurality of PDSCHs scheduled by the current PDCCH is located.

At this step, the NB-IoT device may determine the first valid sub-frame spaced from the candidate sub-frame by the specified number of sub-frames as the target subframe. The candidate subframe is the sub-frame where the last PDSCH of the plurality of PDSCHs scheduled by the current PDCCH is located.

Considering coexistence of the current NB-IoT system and the LTE system, some subframes may be used for communication in the NB-IoT system, and some subframes need to be scheduled to the LTE system. Therefore, the target subframe may be the first valid sub-frame spaced from the candidate sub-frame by a specified number of sub-frames, that is, the target subframe may be the first subframe spaced from the candidate sub-frame by a specified number of sub-frames and scheduled to the NB-IoT system.

Optionally, the specified number of sub-frames may be k+12, where the value of k may be configured by the base station via the second target signaling, for example, the DCI signaling.

At step 105-2, a time at which the target sub-frame is sent is determined as the target feedback time.

At this step, the NB-IoT system directly determines the time at which the target sub-frame is sent as the target feedback time according to technologies in the related art.

In the above embodiment, after scheduling of the last PDSCH of the plurality of PDSCHs scheduled by the current PDCCH is completed, the plurality of target HARQ results may be reported to the base station in a unified manner, which improves the efficiency of HARQ feedback in the NB-IoT system, reduces consumption of NPUSCH resources and helps to save the power of the NB-IoT device.

The above HARQ feedback method according to embodiment of the present disclosure is further described as follows.

In example 1, the NB-IoT device converts the plurality of target HARQ results into corresponding binary values based on a preset correspondence between HARQ results and binary values. Further, the NB-IoT device performs a logical AND operation on the binary values corresponding to the plurality of target HARQ results to obtain an operation result, and finally determines the operation result as the combined HARQ result. The NB-IoT device performs BPSK adjustment on the combined HARQ result, and subsequently sends the target NPUSCH in the preset format to the base station, for example, as shown in FIG. 4.

Or, the NB-IoT device may divide the plurality of target HARQ results into a plurality of groups of target HARQ results, perform the logical AND operation on the binary values corresponding to target HARQ results in each of the plurality of groups of target HARQ results to obtain an operation result, and determine the operation result as the corresponding group of target HARQ results. The NB-IoT device performs QPSK adjustment on the combined HARQ result corresponding to each HARQ group, and subsequently sends the target NPUSCH in the NPUSCH format 2 to the base station, for example, as shown in FIG. 6.

The NB-IoT device carries the combined HARQ result by the target resource and sends the target NPUSCH to the base station at the target feedback time. The method of determining the target feedback time is shown in FIG. 10, which is not repeated here.

In addition, the NB-IoT device may determine the target NPUSCH by using the above formula 1. Alternatively, the NB-IoT device may also receive the first target signaling sent by the base station to determine the NPUSCH group, and then determine the target NPUSCH in the NPUSCH group according to the second target signaling sent by the base station.

The above-mentioned embodiments are all aimed at realizing the purpose of representing the plurality of target HARQ results by the combined HARQ result. In embodiments of the present disclosure, the plurality of target HARQ results may be represented by both the combined HARQ result and the target resource, the implementation of which is described as follows.

Figure 11:
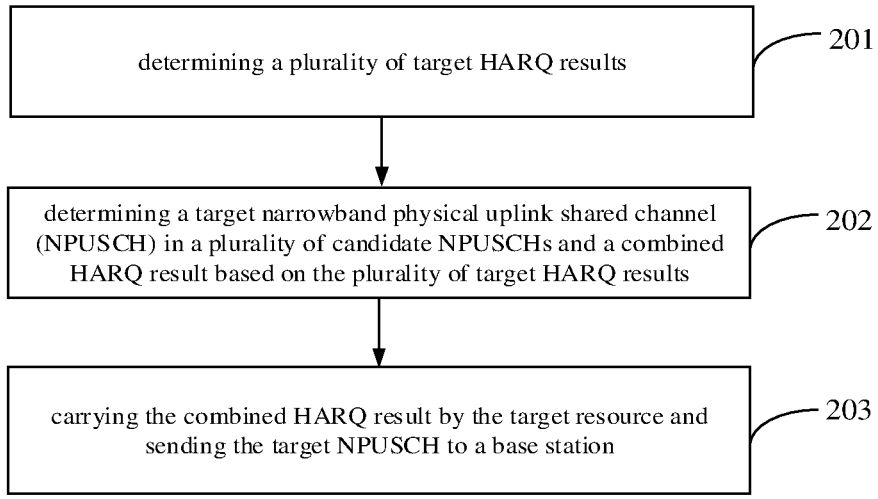
FIG. 11 is a flowchart of another HARQ feedback method according to an exemplary embodiment.

Embodiments of the present disclosure further provide another HARQ feedback method. The method may be applied to a NB-IoT device, such as intelligent meter reading used in smart cities, shared bicycles in smart transportation, and temperature and humidity collection devices in smart agriculture. FIG. 11 is a flowchart of another HARQ feedback method according to an exemplary embodiment. As illustrated in FIG. 11, the method may include the following steps.

At step 201, a plurality of target HARQ results are determined, in which the plurality of target HARQ results are HARQ results corresponding to a plurality of target physical downlink shared channels (PDSCHs), and the plurality of target PDSCHs are PDSCHs scheduled by a current physical downlink control channel (PDCCH).

At step 202, a target narrowband physical uplink shared channel (NPUSCH) in a plurality of candidate NPUSCHs and a combined HARQ result are determined based on the plurality of target HARQ results, in which the target NPUSCH is a NPUSCH with a corresponding target resource used for carrying the combined HARQ result, and the combined HARQ result and the target resource are used for representing the plurality of target HARQ results.

At step 203, the combined HARQ result is carried by the target resource and the target NPUSCH is sent to a base station.

In the above embodiments, the purpose of representing the plurality of target HARQ results by both the combined HARQ result and the target resource corresponding to the target NPUSCH is achieved, which further saves the target resource and improves the efficiency of HARQ feedback in the NB-IoT system, and is conducive to saving the power of the NB-IoT device.

At step 201, in the NB-IoT system, the current PDCCH may schedule a plurality of consecutive PDSCHs at the same time, and the NB-IoT device may determine the HARQ result corresponding to each PDSCH according to technologies in the related art.

Optionally, the HARQ result corresponding to each PDSCH may be ACK or NACK.

At step 202, the target NPUSCH is a NPUSCH with its own resource used for carrying the HARQ results, and the target resource is the time frequency domain used by the target NPUSCH in the NB-IoT system.

The NB-IoT device may first determine a plurality of candidate NPUSCHs. In the embodiments of the present disclosure, NPUSCHs in format 2 may be adopted.

Figure 12:
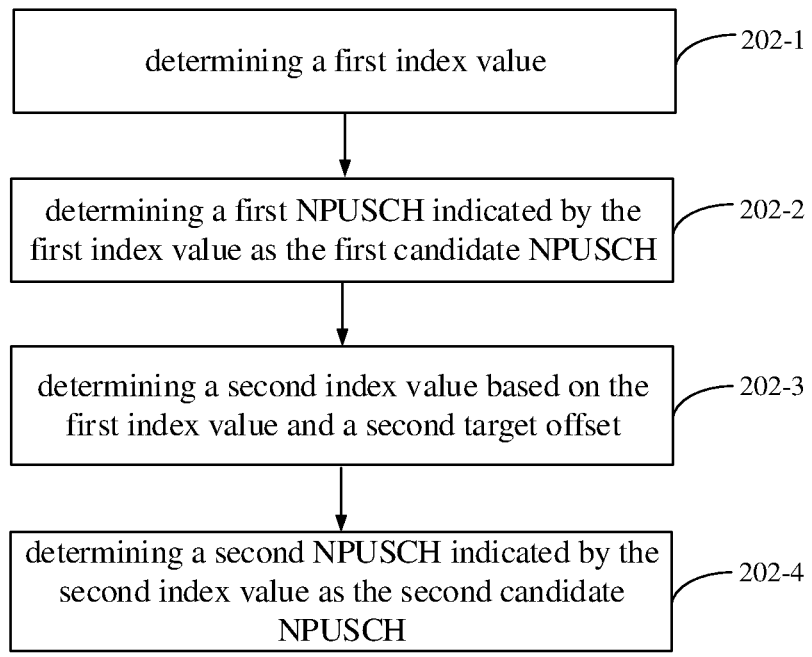
FIG. 12 is a flowchart of another HARQ feedback method according to an exemplary embodiment.

Optionally, referring to FIG. 12, which is a flowchart of another HARQ feedback method based on the embodiment shown in FIG. 11, determining the plurality of candidate NPUSCHs may include the following bocks.

At step 202-1, a first index value is determined, in which the first index value is a resource index value corresponding to a first candidate NPUSCH in the plurality of candidate NPUSCHs.

In this process, the NB-IoT device may determine the first index value based on a frequency value corresponding to a preset subcarrier and a first target offset. Optionally, a sum of the frequency value corresponding to the preset subcarrier and the first target offset may be calculated, and determined as the first index value.

The preset subcarrier is a subcarrier at a starting frequency domain location of a NPUSCH used for carrying the plurality of target HARQ results, and the first target offset is an offset in a frequency domain where a NPUSCH resource used for feeding back the plurality of target HARQ results is located. The starting frequency domain location may be configured by the base station via first target signaling, for example, the RRC signaling, and the first target offset may be configured by the base station via the second target signaling, for example, the DCI signaling.

In this process, the NB-IoT device may calculate the first index value F1_NPUSCH format 2 according to the following formula 2.

$$F1\_NPUSCH\ format\ 2 = f0 + f\_n, \qquad \text{formula 2}$$

f0 is the frequency value corresponding to the preset subcarrier, and f_n is the first target offset.

At step 202-2, a NPUSCH indicated by the first index value is determined as the first candidate NPUSCH.

In this step, the NB-IoT device directly uses the NPUSCH at the frequency domain location indicated by the first index value as the first candidate NPUSCH from the plurality of candidate NPUSCHs.

At step 202-3, a second index value is determined based on the first index value and a second target offset.

In the embodiments of the present disclosure, the second target offset is pre-configured to indicate the offset in the frequency domain of the NPUSCH resource corresponding to the second candidate NPUSCH, and the second candidate NPUSCH is any one of the plurality of candidate NPUSCHs other than the first NPUSCH.

Optionally, the second target offset may be pre-defined in the protocol and written into an underlying system of the NB-IoT device, or may be sent by the base station via the first target signaling, for example, the RRC signaling. Alternatively, the second target offset may also be sent to the NB-IoT device by the base station via the second target signaling, for example, the DCI signaling.

In this process, the NB-IoT device may calculate a second sum Fi_NPUSCH format 2 based on formula 3, where i=2, 3, 4 . . . .

$$Fi\_NPUSCH\ format\ 2 = f0 + f\_n + \text{offset}\ i \qquad \text{formula 3}$$

f0 is the frequency value corresponding to the preset subcarrier, f_n is the first target offset, and offset i is the second target offset.

At step 202-4, a NPUSCH indicated by the second index value is determined as the second candidate NPUSCH.

In this process, the NB-IoT device may determine the NPUSCH indicated by the second index value as the second candidate NPUSCH.

In the embodiments of the present disclosure, if a total number of the plurality of the target HARQ results is 2, then two candidate NPUSCHs may be determined according to Formula 2 and Formula 3.

$$F1\_NPUSCH\ format2 = f0 + f\_n.$$

$$F2\_NPUSCH\ format2 = f0 + f\_n + \text{offset2}.$$

Similarly, if the total number of the plurality of target HARQ results is 3, then 3 candidate NPUSCHs may be determined according to Formula 1 and Formula 2.

$$F1\_NPUSCH\ format2 = f0 + f\_n.$$

$$F2\_NPUSCH\ format2 = f0 + f\_n + \text{offset2}.$$

$$F3\_NPUSCH\ format2 = f0 + f\_n + \text{offset3}.$$

Likewise, a plurality of candidate NPUSCHs may be obtained.

Certainly, if the total number of target HARQ results is large, the plurality of target HARQ results may be divided into a plurality of groups of target HARQ results, and a plurality of candidate NPUSCHs may be determined for each of the plurality of groups of target HARQ results.

For example, if the total number of target HARQ results is 8, and the plurality of target HARQ results are divided into 4 groups of target HARQ results evenly, then there may be 4 candidate NPUSCHs.

$$F1\_NPUSCH\ format2 = f0 + f\_n.$$

$$F2\_NPUSCH\ format2 = f0 + f\_n + \text{offset2}.$$

$$F3\_NPUSCH\ format2 = f0 + f\_n + \text{offset3}.$$

$$F4\_NPUSCH\ format2 = f0 + f\_n + \text{offset4}.$$

In the embodiments of the present disclosure, after determining the plurality of candidate NPUSCHs, the NB-IoT device may determine the target NPUSCH in the plurality of candidate NPUSCHs and the combined HARQ result based on a preset mapping relation between target HARQ results, target NPUSCHs and combined HARQ results.

Assuming that the total number of the plurality of target HARQ results is 2, according to the above formula 2 and formula 3, two candidate NPUSCHs are determined, and the preset mapping relation between target HARQ results, target NPUSCHs and combined HARQ results is shown in Table 2.

TABLE 2

| combined HARQ results | Target resources | Target HARQ results to be represented |
|---|---|---|
| X (X may be 0 or 1) | F1_NPUSCH format 2<br>F2_NPUSCH format 2 | X00<br>X01 |

Assuming that the target HARQ results are 0 and 1, then according to Table 2, the combined HARQ result is 0, the target NPUSCH is F2_NPUSCH format 2.

In the above embodiment, the NB-IoT device may determine the target NPUSCH in the plurality of candidate NPUSCHs and the combined HARQ result based on the preset mapping relation between target HARQ results, target NPUSCHs and combined HARQ results. The purpose of representing the plurality of target HARQ results by both the combined HARQ result and the target resource corresponding to the target NPUSCH is achieved, which further saves the target resource and improves the efficiency of HARQ feedback in the NB-IoT system, and is conducive to saving power of the NB-IoT device.

At step 203, the NB-IoT device may carry the combined HARQ result by the target resource and send the target NPUSCH to the base station according to technologies in the related art.

Figure 13:
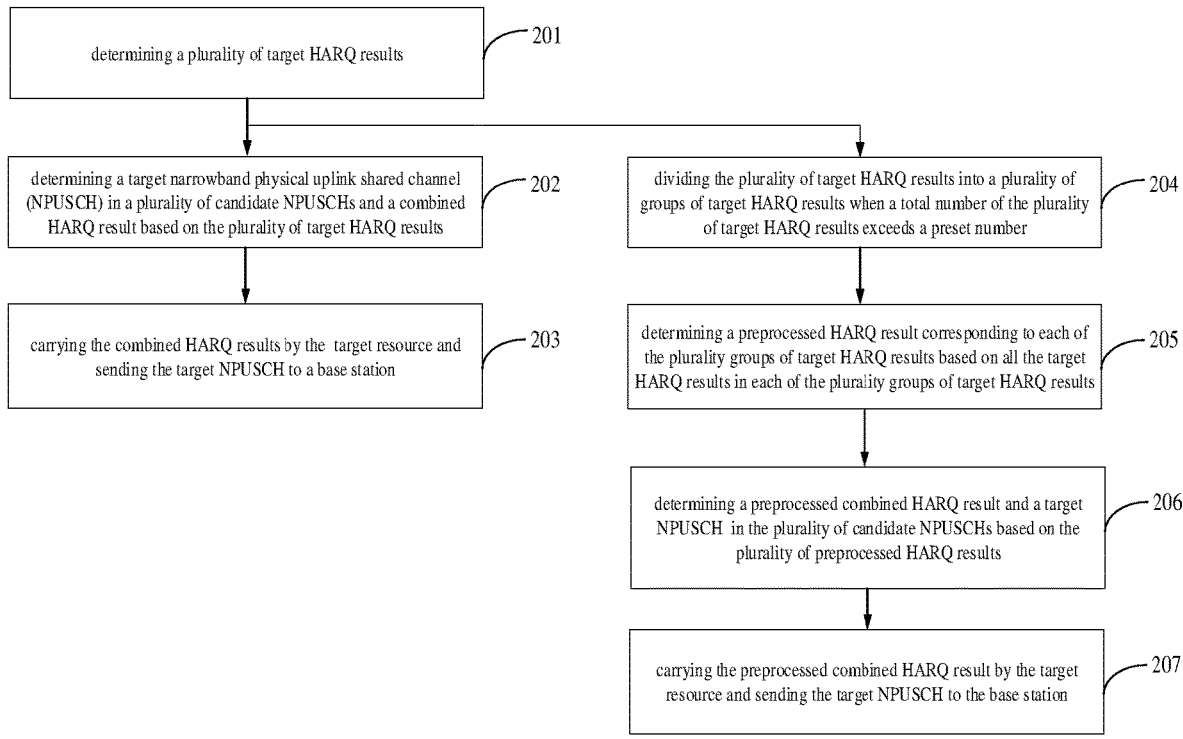
FIG. 13 is a flowchart of a HARQ feedback method according to an exemplary embodiment.

In an embodiment, referring to FIG. 13, which is a flowchart of another HARQ feedback method according to the embodiment shown in FIG. 10, the method may include the following steps.

At step 204, the plurality of target HARQ results are divided into a plurality of groups of target HARQ results when a total number of the plurality of target HARQ results exceeds a preset number.

At this step, the NB-IoT device may divide the plurality of target HARQ results into the plurality of groups of target HARQ results when the total number of the plurality of target HARQ results is large, for example, when the total number exceeds 3. Optionally, the plurality of target HARQ results may be divided into a plurality of groups of target HARQ results evenly.

At step 205, a preprocessed HARQ result corresponding to each of the plurality of groups of target HARQ results is determined based on all the target HARQ results in each of the plurality of groups of target HARQ results.

At this step, the NB-IoT device may convert all the target HARQ results in each of the plurality of groups of target HARQ results into binary values, and then perform a logical AND operation on the binary values, and determine the operation result as the preprocessed HARQ result corresponding to the current HARQ group.

For example, all the target HARQ results included in the current HARQ group are: ACK, NACK, which are converted into binary values 1 and 0, and the preprocessed HARQ result corresponding to the current HARQ group obtained after the logical AND operation is 0.

At step 206, a target NPUSCH in the plurality of candidate NPUSCHs and a preprocessed combined HARQ result are determined based on the plurality of preprocessed HARQ results, in which the target NPUSCH is a NPUSCH with a corresponding target resource carrying the preprocessed combined HARQ result, and the preprocessed combined HARQ result and the target resource are used for representing the plurality of preprocessed HARQ results.

At this step, the NB-IoT device may determine the target PUCCH and the preprocessed combined HARQ result based on the preset mapping relation between a plurality of preprocessed HARQ results, target resources and pre-processed combined HARQ results.

For example, a total number of the plurality of preprocessed HARQ results is 3, and the preset mapping relation between the plurality of preprocessed HARQ results, target resources and pre-processed combined HARQ results is shown in Table 3.

TABLE 3

| Pre-processed combined HARQ results | Target resources | Pre-processed HARQ results to be represented |
|---|---|---|
| X (X may be 0 or 1) | F1_NPUSCH format 2<br>F2_NPUSCH format 2<br>F3_NPUSCH format 2<br>F4_NPUSCH format 2 | X00<br>X01<br>X10<br>X11 |

Assuming that the plurality of pre-processed HARQ results are 0 1 0, then according to Table 3, the combined HARQ result is 0, and the target NPUSCH is F3_NPUSCH format 2.

At step 207, the preprocessed combined HARQ result is carried by the target resource and the target NPUSCH is sent to the base station.

At this step, the NB-IoT device may carry the preprocessed combined HARQ result by the target resource and send the target NPUSCH to the base station according to technologies in the related art.

In the above embodiment, the plurality of target HARQ results are divided into a plurality of groups of target HARQ results when a total number of the plurality of target HARQ results exceeds the preset number. The preprocessed combined HARQ result and the target NPUSCH in the plurality of candidate NPUSCHs are determined based on the plurality of preprocessed HARQ results corresponding to the plurality of groups of target HARQ results. The preprocessed combined HARQ result is carried by the target resource and the target NPUSCH is sent to the base station. In the above embodiments, when the total number of the plurality of target HARQ results is large, the purpose of representing the plurality of target HARQ results by both the combined HARQ result and the target resource corresponding to the target NPUSCH is still achieved, which further saves the target resource and improves the efficiency of HARQ feedback in the NB-IoT system, and is conducive to saving the power of the NB-IoT device.

Figure 14:
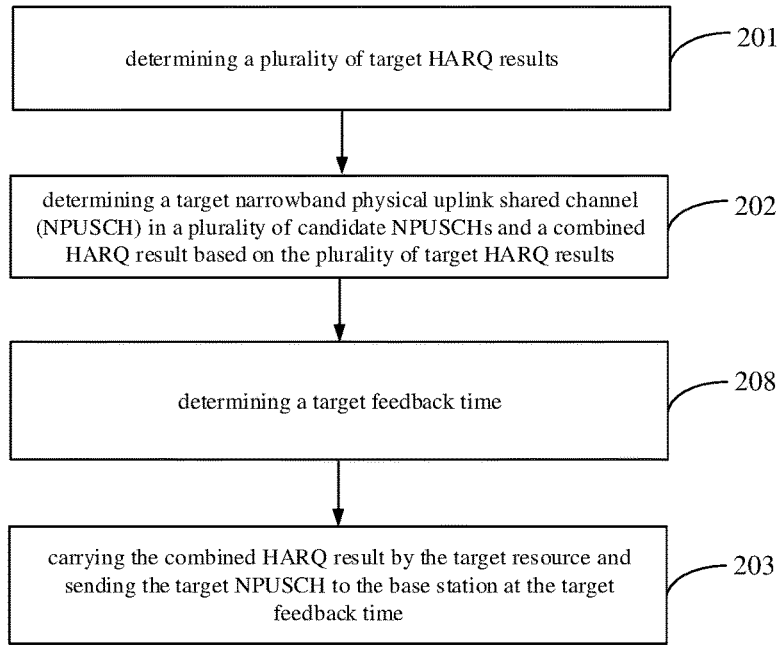
FIG. 14 is a flowchart of a HARQ feedback method according to an exemplary embodiment.

Referring to FIG. 14, which is a flowchart of another HARQ feedback method according to the embodiment shown in FIG. 10, the method may further include the following steps.

At step 208, a target feedback time is determined.

At this step, the NB-IoT device may determine the time at which the combined HARQ result needs to be fed back.

Correspondingly, step 204 may include:
carrying the combined HARQ result by the target source and sending the target NPUSCH to the base station at the target feedback time.

In other words, when the target feedback time is reached, the target resource corresponding to the target NPUSCH may be used to carry the combined HARQ result, and the target NPUSCH may be sent to the base station.

Figure 15:
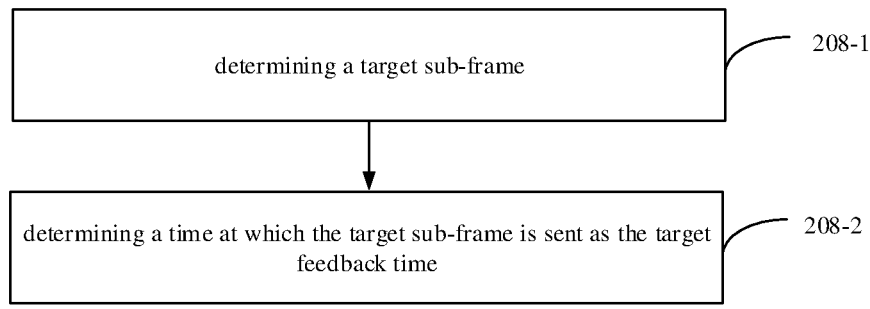
FIG. 15 is a flowchart of another HARQ feedback method according to an exemplary embodiment.

In the above embodiment, referring to FIG. 15, which is a flowchart of another HARQ feedback method according to the embodiment shown in FIG. 14, step 208 may include the following steps.

At step 208-1, a target sub-frame is determined, in which the target sub-frame is a first valid sub-frame spaced from a candidate sub-frame by a specified number of sub-frames, and the candidate sub-frame is a sub-frame where a last PDSCH of the plurality of PDSCHs scheduled by the current PDCCH is located.

At this step, the NB-IoT device may determine the first valid sub-frame spaced from the candidate sub-frame by the specified number of sub-frames as the target sub-frame. The candidate sub-frame is a sub-frame where a last PDSCH of the plurality of PDSCHs scheduled by the current PDCCH is located.

Considering coexistence of the current NB-IoT system and the LTE system, some subframes may be used for communication in the NB-IoT system, and some subframes need to be scheduled to the LTE system. Therefore, the target subframe may be the first valid sub-frame spaced from the candidate sub-frame by the specified number of sub-frames, that is, the target subframe may be the first subframe spaced from the candidate sub-frame by the specified number of sub-frames and scheduled to the NB-IoT system.

Optionally, the specified number of sub-frames may be k+12, where the value of k may be configured by the base station via the second target signaling, for example, the DCI signaling.

At step 208-2, a time at which the target sub-frame is sent is determined as the target feedback time.

At this step, the NB-IoT system directly determine the time at which the target sub-frame is sent as the target feedback time according to technologies in the related art.

In the above embodiment, after scheduling of the last PDSCH of the plurality of PDSCHs scheduled by the current PDCCH is completed, the plurality of target HARQ results are uniformly reported to the base station, which improves the efficiency of HARQ feedback in the NB-IoT system and reduces consumption of NPUSCH resources, and is conducive to saving power of the NB-IoT device.

In the above embodiment, similarly, the target NPUSCH may be sent to the base station in NPUSCH format 2.

In the following, the above HARQ feedback method in which the plurality of target HARQ results are represented by both the combined HARQ result and the target resource is further described by examples.

In example 2, the total number of the plurality of target HARQ results is 2, and the NB-IoT device determines 2 candidate NPUSCHs according to formula 2 and formula 3 as follows.

$F1\_NPUSCH\ format\ 2 = f0 + f\_n.$ $F2\_NPUSCH\ format\ 2 = f0 + f\_n + offset2.$ One target HARQ result is fed back through the target resource, and the other target HARQ result is fed back through the combined HARQ result carried in the target NPUSCH, as shown in Table 2.

Assuming that the total number of target HARQ results is 3, the NB-IoT device determines 3 candidate NPUSCHs according to the above formula 1 and formula 2 as follows.

$F1\_NPUSCH\ format2 = f0 + f\_n.$ $F2\_NPUSCH\ format2 = f0 + f\_n + offset2.$ $F3\_NPUSCH\ format2 = f0 + f\_n + offset3.$ One target HARQ result is fed back through the combined HARQ result carried in the target NPUSCH, and the other two target HARQ results are fed back through the target resource, as shown in Table 4.

TABLE 4

| Combined HARQ results | Target resources | Target HARQ results to be represented |
| --- | --- | --- |
| X (X may be 0 or 1) | F1_NPUSCH format 2 | X00 |
| | F2_NPUSCH format 2 | X01 |
| | F3_NPUSCH format 2 | X10 |
| | F4_NPUSCH format 2 | X11 |

For example, the total number of target HARQ results is large and greater than 3, the total number is 6, the plurality of target HARQ results are evenly divided into 3 groups of target HARQ results. The NB-IoT device determines 4 candidate NPUSCHs based on formula 2 and formula 3 as follows.

$F1\_NPUSCH\ format\ 2 = f0 + f\_n.$ $F2\_NPUSCH\ format\ 2 = f0 + f\_n + offset2.$ $F3\_NPUSCH\ format\ 2 = f0 + f\_n + offset3.$ $F4\_NPUSCH\ format\ 2 = f0 + f\_n + offset4.$ One pre-processed HARQ result is fed back through the pre-processed combined HARQ result carried in the target NPUSCH, and the other two pre-processed HARQ results are fed back through the target resource, as shown in Table 3.

In the above embodiment, the purpose of representing the plurality of target HARQ results by both the combined HARQ result and the target resource corresponding to the target NPUSCH is achieved, which further saves the target resource and improves the efficiency of HARQ feedback in the NB-IoT system, and is conducive to saving power of the NB-IoT device.

In an embodiment, optionally, switching between different implementations may be performed according to the total number of the target HARQ results. For example, if the total number of the target HARQ results is small and maybe one or two, the method provided in the above example 1 may be used to feedback the target HARQ results. If the number of the target HARQ results is large and greater than 3, the method provided in Example 2 may be used to feedback the target HARQ results. The switching between the above different solutions should also fall within the protection scope of the present disclosure.

Corresponding to implementing the foregoing method embodiments, the present disclosure also provides apparatus and corresponding NB-IoT device embodiments.

Figure 16:
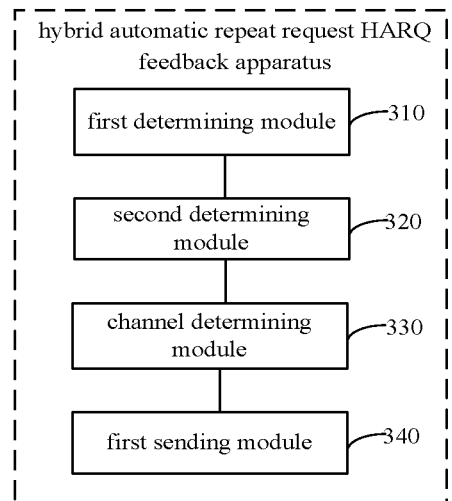
FIG. 16 is a schematic diagram of a HARQ feedback apparatus according to an exemplary embodiment.

FIG. 16 is a block diagram of a HARQ feedback apparatus according to an exemplary embodiment. As illustrated in FIG. 16, the apparatus is used in a Narrow Band Internet of Things (NB-IoT) device. The apparatus includes: a first determining module 310, a second determining module 320, a channel determining module 330 and a first sending module 340.

The first determining module 310 is configured to determine a plurality of target HARQ results, in which the plurality of target HARQ results are HARQ results corresponding to a plurality of target physical downlink shared channels (PDSCHs), and the plurality of target PDSCHs are PDSCHs scheduled by a current physical downlink control channel (PDCCH).

The second determining module 320 is configured to determine a combined HARQ result based on the plurality of target HARQ results, in which the combined HARQ result is used for representing the plurality of target HARQ results.

The channel determining module 330 is configured to determine a target narrowband physical uplink shared channel (NPUSCH), in which the target NPUSCH is a NPUSCH with a target resource carrying the combined HARQ result.

The first sending module 340 is configured to carry the combined HARQ result by the target resource and send the target NPUSCH to a base station.

Figure 17:
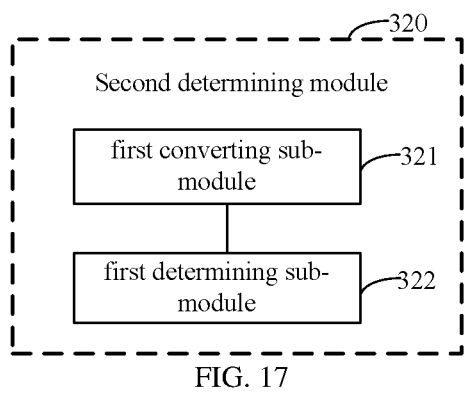
FIG. 17 is a schematic diagram of another HARQ feedback apparatus according to an exemplary embodiment.

Referring to FIG. 17, which is a block diagram of another HARQ feedback apparatus on the basis of the embodiment shown in FIG. 16, the first determining module 310 includes: a first converting sub-module 311 and a first determining sub-module 312.

The first converting sub-module 311 is configured to convert the plurality of target HARQ results into corresponding binary values based on a preset correspondence between HARQ results and binary values.

The first determining sub-module 312 is configured to perform a logical AND operation on the binary values corresponding to the plurality of target HARQ results to obtain an operation result, and to determine the operation result as the combined HARQ result.

Figure 18:
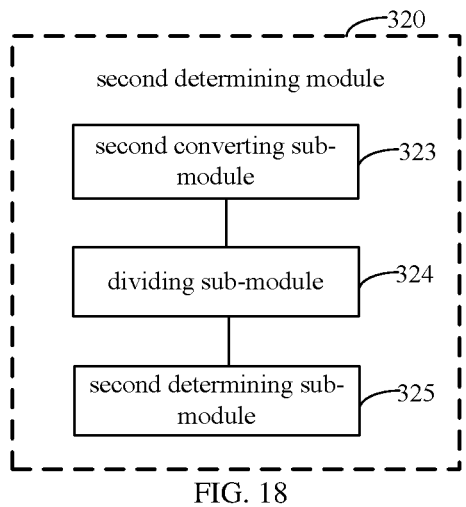
FIG. 18 is a schematic diagram of another HARQ feedback apparatus according to an exemplary embodiment.

Referring to FIG. 18, which is a block diagram of another HARQ feedback apparatus on the basis of the embodiment shown in FIG. 16, the second determining module 320 includes: a second converting sub-module 321, a dividing sub-module 322 and a second determining sub-module 323.

The second converting sub-module 321 is configured to convert the plurality of target HARQ results into corresponding binary values based on the preset correspondence between HARQ results and binary values.

The dividing sub-module 322 is configured to divide the plurality of target HARQ results into a plurality of groups of target HARQ results.

The second determining sub-module 323 is configured to perform a logical AND operation on binary values corresponding to target HARQ results in each of the plurality of groups of target HARQ results to obtain an operation result, and to determine the operation result as the combined HARQ result of the current group of target HARQ results.

Figure 19:
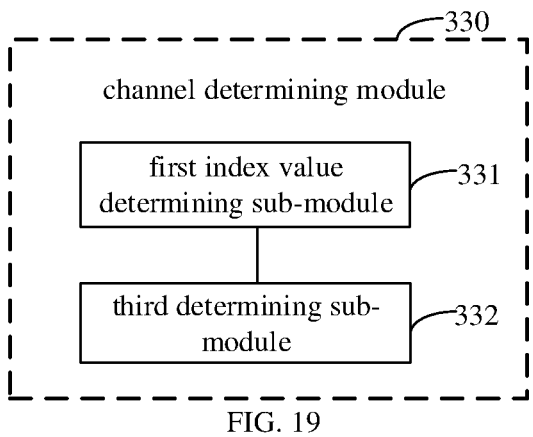
FIG. 19 is a schematic diagram of another HARQ feedback apparatus according to an exemplary embodiment.

Referring to FIG. 19, which is a block diagram of another HARQ feedback apparatus on the basis of the embodiment shown in FIG. 16, the channel determining module 330 includes: a first index value determining module 331 and a third determining sub-module 332.

The first index value determining module 331 is configured to determine a target index value of the target resource.

The third determining sub-module 332 is configured to determine a NPUSCH indicated by the target index value as the target NPUSCH.

Figure 20:
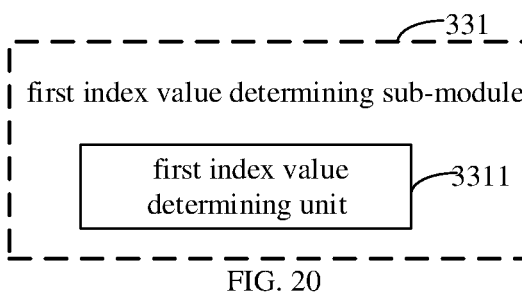
FIG. 20 is a schematic diagram of another HARQ feedback apparatus according to an exemplary embodiment.

Referring to FIG. 20, which is a block diagram of another HARQ feedback apparatus on the basis of the embodiment shown in FIG. 19, the first index value determining module 331 includes: a first index value determining unit 3311.

The first index value determining unit 3311 is configured to determine the target index value based on a frequency value corresponding to a preset subcarrier and a first target offset, in which the preset subcarrier is a subcarrier at a starting frequency domain location of a NPUSCH used for carrying the plurality of target HARQ results, and the first target offset is an offset in a frequency domain where a NPUSCH resource used for feeding back the plurality of target HARQ results is located.

Figure 21:
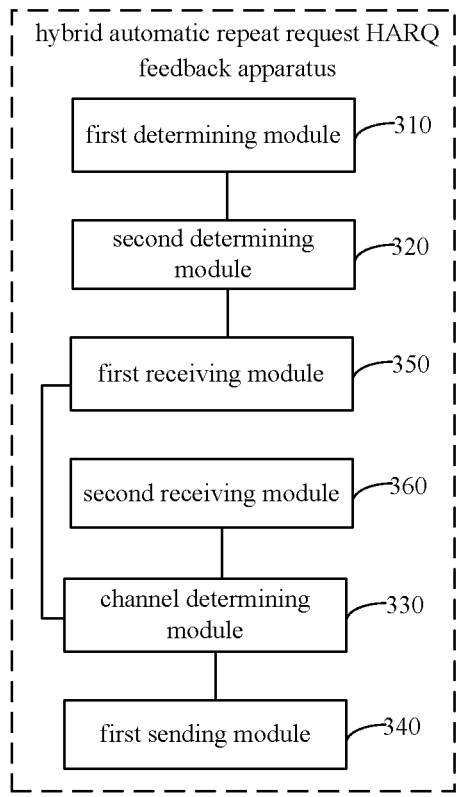
FIG. 21 is a schematic diagram of another HARQ feedback apparatus according to an exemplary embodiment.

Referring to FIG. 21, which is a block diagram of another HARQ feedback apparatus on the basis of the embodiment show in FIG. 20, the apparatus includes: a first receiving module 350 and a second receiving module 360.

The first receiving module 350 is configured to receive the starting frequency domain location sent by the base station via a first target signaling.

The second receiving module 360 is configured to receive the first target offset sent by the base station via a second target signaling.

Figure 22:
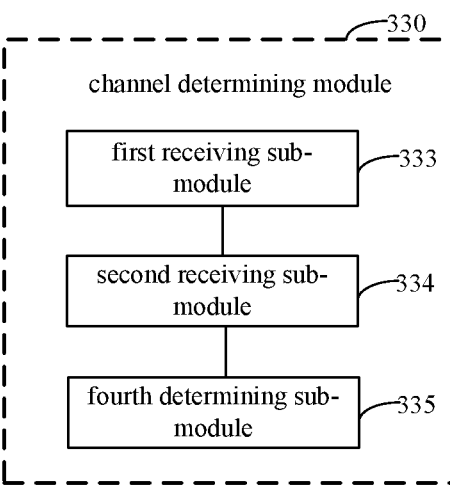
FIG. 22 is a schematic diagram of another HARQ feedback apparatus according to an exemplary embodiment.

Referring to FIG. 22, which is a block diagram of another HARQ feedback apparatus on the basis of the embodiment shown in FIG. 16, the channel determining module 330 includes: a first receiving sub-module 333, a second receiving sub-module 334 and a fourth determining sub-module 335.

The first receiving sub-module 333 is configured to receive a NPUSCH group including a plurality of candidate NPUSCHs sent by the base station via the first target signaling.

The second receiving sub-module 334 is configured to receive the second target signaling sent by the base station, the second target signaling carrying resource indication information used to indicate the target resource.

The fourth determining sub-module 335 is configured to determine a candidate NPUSCH corresponding to the target resource from the NPUSCH group as the target NPUSCH based on the resource indication information.

Figure 23:
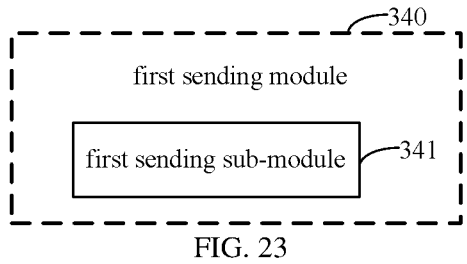
FIG. 23 is a schematic diagram of another HARQ feedback apparatus according to an exemplary embodiment.

Referring to FIG. 23, which is a block diagram of another HARQ feedback apparatus on the basis of the embodiment shown in FIG. 16, the first sending module 340 includes a first sending sub-module 341.

The first sending sub-module 341 is configured to carry the combined HARQ result by the target resource and to send the target NPUSCH in a preset format to the base station.

Figure 24:
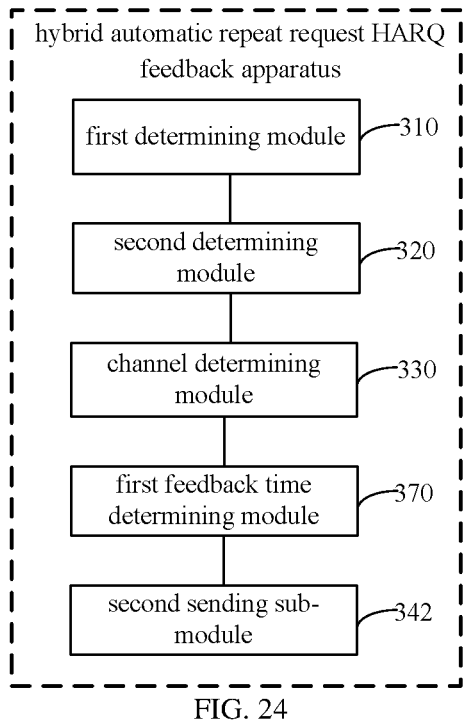
FIG. 24 is a schematic diagram of another HARQ feedback apparatus according to an exemplary embodiment.

Referring to FIG. 24, which is a block diagram of another HARQ feedback apparatus on the basis of the embodiment shown in FIG. 16, the apparatus further includes: a first feedback time determining module 370.

The first feedback time determining module 370 is configured to determine a target feedback time.

The first sending module 340 includes a second sending sub-module 342.

The second sending sub-module 342 is configured to carry the combined HARQ result by the target resource and send the target NPUSCH to the base station at the target feedback time.

Figure 25:
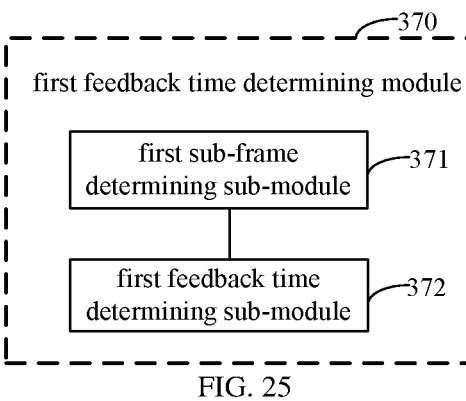
FIG. 25 is a schematic diagram of another HARQ feedback apparatus according to an exemplary embodiment.

Referring to FIG. 25, which is a block diagram of another HARQ feedback apparatus on the basis of the embodiment shown in FIG. 24, the first feedback time determining module 370 includes: a first sub-frame determining sub-module 371 and a first feedback time determining sub-module 372.

The first sub-frame determining sub-module 371 is configured to determine a target sub-frame, in which the target sub-frame is a first valid sub-frame spaced from a candidate sub-frame by a specified number of sub-frames, and the candidate sub-frame is a sub-frame where a last PDSCH of the plurality of PDSCHs scheduled by the current PDCCH is located.

The first feedback time determining sub-module 372 is configured to determine a time at which the target sub-frame is sent as the target feedback time.

Figure 26:
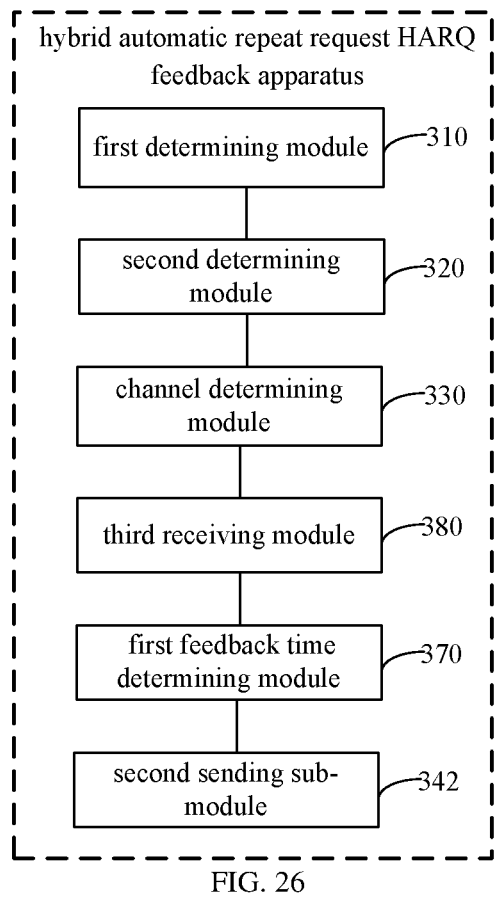
FIG. 26 is a schematic diagram of another HARQ feedback apparatus according to an exemplary embodiment.

Referring to FIG. 26, which is a block diagram of another HARQ feedback apparatus on the basis of the embodiment Shown in FIG. 25, the apparatus further includes a third receiving module 380.

The third receiving module 380 is configured to receive the specified number of sub-frames sent by the base station via the second target signaling.

Figure 27:
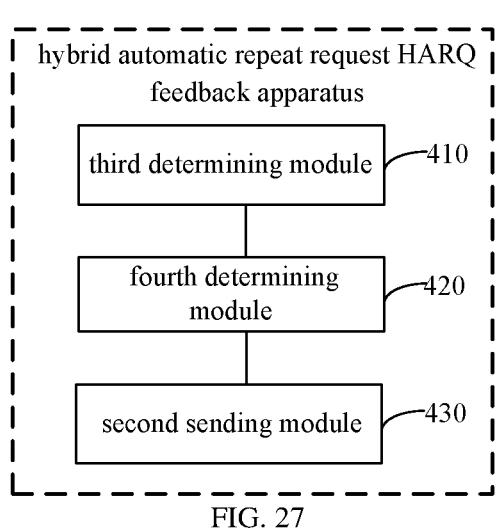
FIG. 27 is a schematic diagram of another HARQ feedback apparatus according to an exemplary embodiment.

FIG. 27 is a block diagram of a HARQ feedback apparatus according to an exemplary embodiment. As illustrated in FIG. 27, the HARQ feedback apparatus is used in a NB-IoT device. The apparatus includes: a third determining module 410, a fourth determining module 420 and a second sending module 430.

The third determining module 410 is configured to determine a plurality of target HARQ results, in which the plurality of target HARQ results are HARQ results corresponding to a plurality of target physical downlink shared channels (PDSCHs), and the plurality of target PDSCHs are PDSCHs scheduled by a current physical downlink control channel (PDCCH).

The fourth determining module 420 is configured to determine a target narrowband physical uplink shared channel (NPUSCH) in a plurality of candidate NPUSCHs and a combined HARQ result based on the plurality of target HARQ results, in which the target NPUSCH is a NPUSCH with a target resource carrying the combined HARQ result, and the combined HARQ result and the target resource are used for representing the plurality of target HARQ results.

The second sending module 430 is configured to carry the combined HARQ result by the target resource and send the target NPUSCH to a base station.

Figure 28:
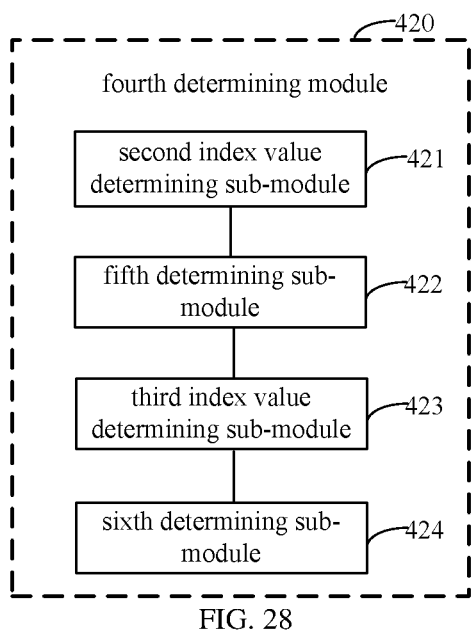
FIG. 28 is a schematic diagram of another HARQ feedback apparatus according to an exemplary embodiment.

Referring to FIG. 28, which is a block diagram of another HARQ feedback apparatus on the basis of the embodiment show in FIG. 27, the fourth determining module 420 includes: a second index value determining sub-module 421, a fifth determining sub-module 422, a third index value determining sub-module 423 and a sixth determining sub-module 424.

The second index value determining sub-module 421 is configured to determine a first index value, in which the first index value is a resource index value corresponding to a first candidate NPUSCH in the plurality of candidate NPUSCHs.

The fifth determining sub-module 422 is configured to determine a first NPUSCH indicated by the first index value as the first candidate NPUSCH.

The third index value determining sub-module 423 is configured to determine a second index value based on the first index value and a second target offset, in which the second target offset is used to indicate an offset of a NPUSCH resource corresponding to a second candidate NPUSCH in the plurality of candidate NPUSCHs, and the second candidate NPUSCH is any one of the plurality of candidate NPUSCHs other than the first NPUSCH.

The sixth determining sub-module 424 is configured to determine a second NPUSCH indicated by the second index value as the second candidate NPUSCH.

Figure 29:
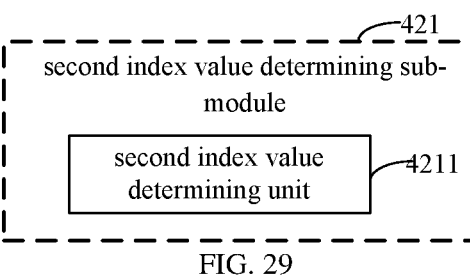
FIG. 29 is a schematic diagram of another HARQ feedback apparatus according to an exemplary embodiment.

Referring to FIG. 29, which is a block diagram of another HARQ feedback apparatus on the basis of the embodiment show in FIG. 28, the second index value determining sub-module 421 includes a second index value determining unit 4211.

The second index value determining unit 4211 is configured to determine the first index value based on a frequency value corresponding to a preset subcarrier and a first target offset, in which the preset subcarrier is a subcarrier at a starting frequency domain location of a NPUSCH used for carrying the plurality of HARQ results, and the first target offset is an offset in a frequency domain where a NPUSCH resource used for feeding back the plurality of HARQ results is located.

Figure 30:
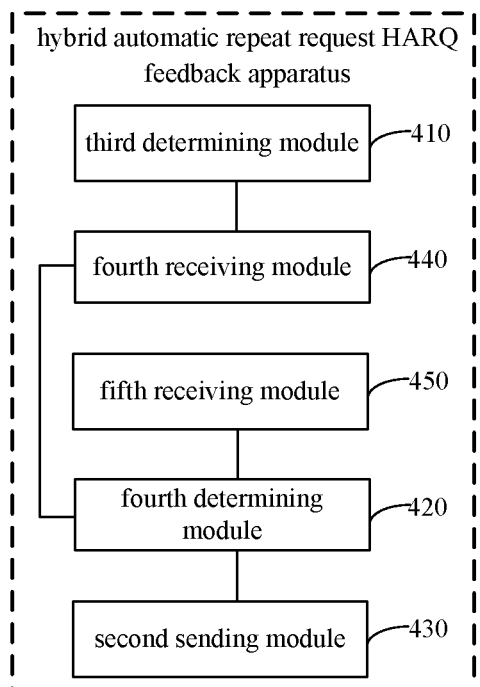
FIG. 30 is a schematic diagram of another HARQ feedback apparatus according to an exemplary embodiment.

Referring to FIG. 30, which is a block diagram of another HARQ feedback apparatus on the basis of the embodiment shown in FIG. 29, the apparatus further includes: a fourth receiving module 440 and a fifth receiving module 450.

The fourth receiving module 440 is configured to receive the starting frequency domain location sent by the base station via a first target signaling.

The fifth receiving module 450 is configured to receive the first target offset sent by the base station via a second target signaling.

Figure 31:
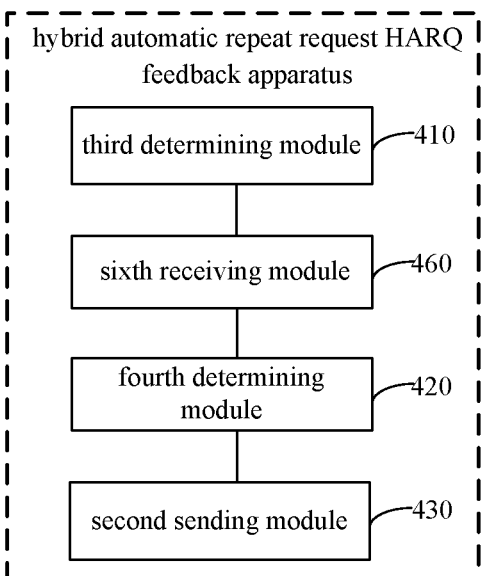
FIG. 31 is a schematic diagram of another HARQ feedback apparatus according to an exemplary embodiment.

Referring to FIG. 31, which is a block diagram of another HARQ feedback apparatus on the basis of the embodiment shown in FIG. 28, the apparatus further includes a sixth receiving module 460.

The sixth receiving module 460 is configured to receive the second target offset sent by the base station via a second target signaling.

Figure 32:
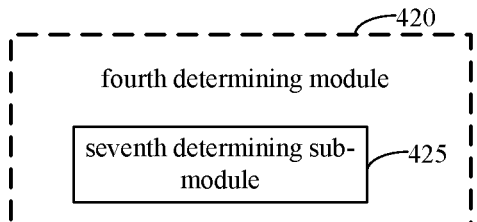
FIG. 32 is a schematic diagram of another HARQ feedback apparatus according to an exemplary embodiment.

Referring to FIG. 32, which is a block diagram of another HARQ feedback apparatus on the basis of the embodiment shown in FIG. 27, the fourth determining module 420 includes a seventh determining sub-module 425.

The seventh determining sub-module 425 is configured to determine the combined HARQ result and the target NPUSCH in the plurality of candidate NPUSCHs based on a preset mapping relation between target HARQ results, target NPUSCHs and combined HARQ results.

Figure 33:
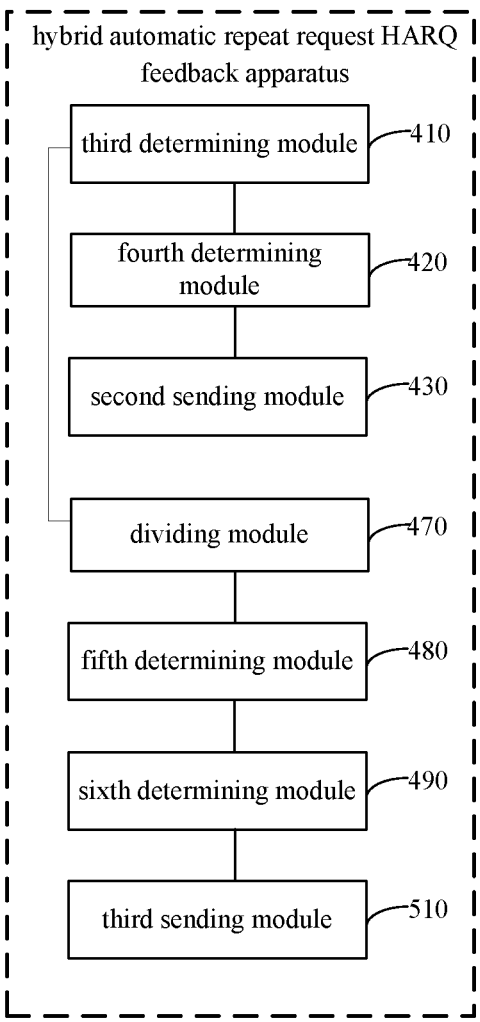
FIG. 33 is a schematic diagram of another HARQ feedback apparatus according to an exemplary embodiment.

Referring to FIG. 33, which is a block diagram of another HARQ feedback apparatus based on the embodiment shown in FIG. 27, the apparatus further includes a dividing module 470, a fifth determining module 480, a sixth determining module 490 and a third sending module 510.

The dividing module 470 is configured to divide the plurality of target HARQ results into a plurality of groups of target HARQ results when a total number of the plurality of target HARQ results exceeds a preset number.

The fifth determining module 480 is configured to determine a preprocessed HARQ result corresponding to each of the plurality of groups of target HARQ results based on all the target HARQ results in each of the plurality of groups of target HARQ results.

The sixth determining module 490 is configured to determine a preprocessed combined HARQ result and a target NPUSCH in the plurality of candidate NPUSCHs based on the plurality of preprocessed HARQ results, in which the target NPUSCH is a NPUSCH with a target resource carrying the preprocessed combined HARQ result, and the preprocessed combined HARQ result and the target resource are used for representing the plurality of preprocessed HARQ results.

The third sending module 510 is configured to carry the preprocessed combined HARQ result by the corresponding target resource and send the target NPUSCH to the base station.

Figure 34:
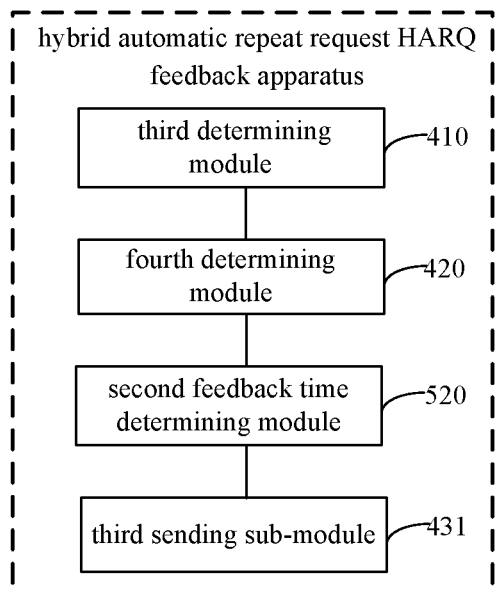
FIG. 34 is a schematic diagram of another HARQ feedback apparatus according to an exemplary embodiment.

Referring to FIG. 34, which is a block diagram of another HARQ feedback apparatus on the basis of the embodiment shown in FIG. 27, the apparatus further includes a second feedback time determining module 520.

The second feedback time determining module 520 is configured to determine a target feedback time.

The second sending module 430 includes a third sending sub-module 431.

The third sending sub-module 431 is configured to carry the combined HARQ result by the target resource and send the target NPUSCH to the base station at the target feedback time.

Figure 35:
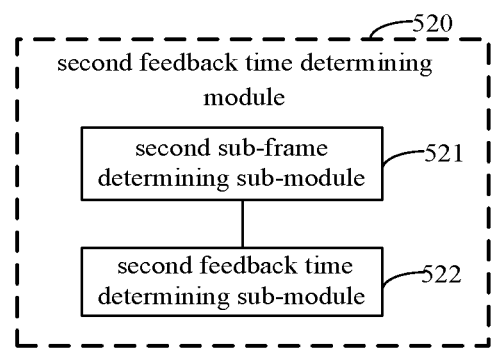
FIG. 35 is a schematic diagram of another HARQ feedback apparatus according to an exemplary embodiment.

On the basis of FIG. 24, FIG. 35 is a block diagram of another HARQ feedback apparatus according to an exemplary embodiment, as illustrated in FIG. 35, The second feedback time determining module 520 includes: a second sub-frame determining sub-module 521 and a second feedback time determining sub-module 522.

The second sub-frame determining sub-module 521 is configured to determine a target sub-frame, in which the target sub-frame is a first valid sub-frame spaced from a candidate sub-frame by a specified number of sub-frames, and the candidate sub-frame is a sub-frame where a last PDSCH of the plurality of PDSCHs scheduled by the current PDCCH is located.

The second feedback time determining sub-module 522 is configured to determine a time at which the target sub-frame is sent as the target feedback time.

Figure 36:
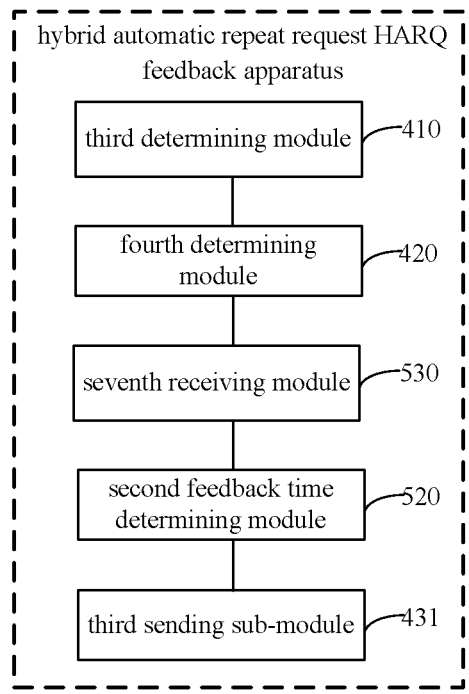
FIG. 36 is a schematic diagram of another HARQ feedback apparatus according to an exemplary embodiment.

On the basis of FIG. 35, FIG. 36 is a block diagram of another HARQ feedback apparatus according to an exemplary embodiment. As illustrated in FIG. 36, the apparatus further includes a seventh receiving module 530.

The seventh receiving module 530 is configured to receive the specified number of sub-frames sent by the base station via the second target signaling.

The apparatus embodiments basically correspond to the method embodiments, and related parts could be referred to part of the description of the method embodiments. The apparatus embodiments described above are merely illustrative. The units described above as separate components may or may not be physically separated, and the components may be located in one place, or distributed across network units. Some or all of the modules could be selected according to actual needs to achieve the objectives of the solution of the present disclosure. Those of ordinary skill in the art could understand and implement the present disclosure, without inventive works.

Correspondingly, the present disclosure also provides a computer-readable storage medium. The storage medium stores a computer program, and the computer program is configured to implement any one of the HARQ feedback methods.

Correspondingly, the present disclosure provides a HARQ feedback apparatus. The apparatus is used in a NB-IoT device. The apparatus includes:
a processor and
a memory configured to store instructions executable by the processor.

The processor is configured to:
determine a plurality of target HARQ results, in which the plurality of target HARQ results are HARQ results corresponding to a plurality of target physical downlink shared channels (PDSCHs), and the plurality of target PDSCHs are PDSCHs scheduled by a current physical downlink control channel (PDCCH);
determine a combined HARQ result based on the plurality of target HARQ results, in which the combined HARQ result is used for representing the plurality of target HARQ results;
determine a target narrowband physical uplink shared channel NPUSCH, in which the target NPUSCH is a NPUSCH with a target resource carrying the combined HARQ result; and
carry the combined HARQ result by the target resource and send the target NPUSCH to a base station.

Correspondingly, the present disclosure provides a HARQ feedback apparatus. The apparatus is used in a NB-IoT device. The apparatus includes:
a processor and
a memory for storing instructions executable by the processor.

The processor is configured to:
determine a plurality of target HARQ results, in which the plurality of target HARQ results are HARQ results corresponding to a plurality of target physical downlink shared channels (PDSCHs), and the plurality of target PDSCHs are PDSCHs scheduled by a current physical downlink control channel (PDCCH);
determine a target narrowband physical uplink shared channel NPUSCH in a plurality of candidate NPUSCHs and a combined HARQ result based on the plurality of target HARQ results, in which the target NPUSCH is a NPUSCH with a target resource carrying the combined HARQ result, and the combined HARQ result and the target resource are used for representing the plurality of target HARQ results; and
carry the combined HARQ result by the target resource and send the target NPUSCH to a base station.

Figure 37:
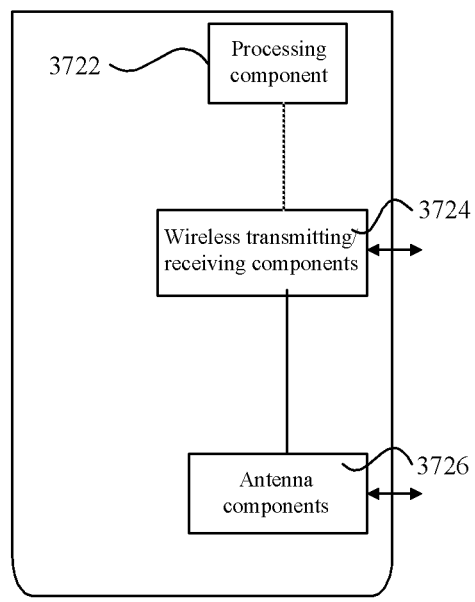
FIG. 37 is a schematic diagram of a HARQ feedback apparatus according to an exemplary embodiment.

FIG. 37 is a schematic diagram of a HARQ feedback apparatus 3700 according to an exemplary embodiment. The apparatus 3700 may be provided as an NB-IoT device. As illustrated in FIG. 37, the apparatus 3700 includes a processing component 3722, a wireless transmitting/receiving component 3724, an antenna component 3726, and a signal processing portion specific to a wireless interface. The processing component 3722 may further include one or more processors.

One of the processors in the processing component 3722 may be configured to execute any of the hybrid automatic repeat request HARQ feedback methods applicable for NB-IoT devices described above.

Those skilled in the art easily think of other embodiments of the present disclosure after considering the description and practicing the disclosure disclosed herein. This disclosure is intended to cover any variations, uses, or adaptive changes that follow the general principles of this disclosure and include common general knowledge or customary technical means in the technical field not disclosed in this disclosure. The description and examples are to be considered exemplary only, and the true scope and spirit of this disclosure are indicated by the claims.

It should be understood that the present disclosure is not limited to the precise structure that has been described above and shown in the drawings, and various modifications and changes can be made without departing from the scope thereof. The scope of the present disclosure is limited only by the appended claims.

What is claimed is:

1. A hybrid automatic repeat request (HARQ) feedback method, applied to a Narrow Band Internet of Things (NB-IoT) device, comprising:
determining a plurality of target HARQ results, wherein the plurality of target HARQ results correspond to a plurality of target physical downlink shared channels (PDSCHs) scheduled by a current physical downlink control channel (PDCCH);

determining a combined HARQ result based on the plurality of target HARQ results, wherein the combined HARQ result is used for representing the plurality of target HARQ results;

determining a target narrowband physical uplink shared channel (NPUSCH), wherein the target NPUSCH includes a target resource to carry the combined HARQ result; and carrying the combined HARQ result by the target resource and sending the target NPUSCH to a base station.

2. The method according to claim 1, wherein determining the combined HARQ result based on the plurality of target HARQ results comprises:

converting the plurality of target HARQ results into corresponding binary values respectively based on a preset correspondence between HARQ results and binary values; and performing a logical AND operation on the binary values corresponding to the plurality of target HARQ results to obtain an operation result, and determining the operation result as the combined HARQ result.

3. The method according to claim 1, wherein determining the combined HARQ result based on the plurality of target HARQ results comprises:

converting the plurality of target HARQ results into corresponding binary values respectively based on a preset correspondence between HARQ results and binary values;

dividing the plurality of target HARQ results into a plurality of groups of target HARQ results; and performing a logical AND operation on binary values corresponding to target HARQ results in each of the plurality of groups of target HARQ results to obtain an operation result, and determining the operation result as the combined HARQ result of the corresponding group of target HARQ results.

4. The method according to claim 1, wherein determining the target NPUSCH comprises:

determining a target index value of the target resource; and determining a NPUSCH indicated by the target index value as the target NPUSCH.

5. The method according to claim 4, wherein determining the target index value of the target resource comprises:

determining the target index value based on a frequency value corresponding to a preset subcarrier and a first target offset, wherein the preset subcarrier is a subcarrier at a starting frequency domain location of a NPUSCH used for carrying the plurality of target HARQ results, and the first target offset is an offset in a frequency domain where a NPUSCH resource used for feeding back the plurality of target HARQ results is located.

6. The method according to claim 5, further comprising:

receiving the starting frequency domain location sent by the base station via a first target signaling; and receiving the first target offset sent by the base station via a second target signaling.

7. The method according to claim 1, wherein determining the target NPUSCH comprises:

receiving a NPUSCH group comprising a plurality of candidate NPUSCHs sent by the base station via a first target signaling;

receiving a second target signaling sent by the base station, the second target signaling carrying resource indication information used to indicate the target resource; and determining a candidate NPUSCH corresponding to the target resource from the NPUSCH group as the target NPUSCH based on the resource indication information.

8. The method according to claim 1, wherein carrying the combined HARQ result by the target resource and sending the target NPUSCH to the base station comprises:

carrying the combined HARQ result by the target resource and sending the target NPUSCH in a preset format to the base station.

9. The method according to claim 1, further comprising:

determining a target feedback time;

wherein carrying the combined HARQ result by the target resource and sending the target NPUSCH to the base station, comprises:

carrying the combined HARQ result by the target resource and sending the target NPUSCH to the base station at the target feedback time.

10. The method according to claim 9, wherein determining the target feedback time comprises:

determining a target sub-frame, wherein the target sub-frame is a first valid sub-frame spaced from a candidate sub-frame by a specified number of sub-frames, and the candidate sub-frame is a sub-frame where a last PDSCH of the plurality of PDSCHs scheduled by the current PDCCH is located; and determining a time at which the target sub-frame is sent as the target feedback time.

11. The method according to claim 10, further comprising:

receiving the specified number of sub-frames sent by the base station via a target signaling.

12. A hybrid automatic repeat request (HARQ) feedback method, applied to a Narrow Band Internet of Things (NB-IoT) device, comprising:

determining a plurality of target HARQ results, wherein the plurality of target HARQ results correspond to a plurality of target physical downlink shared channels (PDSCHs) scheduled by a current physical downlink control channel (PDCCH);

determining a combined HARQ result and a target narrowband physical uplink shared channel (NPUSCH) in a plurality of candidate NPUSCHs based on the plurality of target HARQ results, wherein the target NPUSCH includes a target resource to carry the combined HARQ result, and the combined HARQ result and the target resource are used for representing the plurality of target HARQ results; and carrying the combined HARQ result by the target resource and sending the target NPUSCH to a base station.

13. The method according to claim 12, wherein the plurality of candidate NPUSCHs are determined by:

determining a first index value, the first index value being a resource index value corresponding to a first candidate NPUSCH in the plurality of candidate NPUSCHs;

determining a first NPUSCH indicated by the first index value as the first candidate NPUSCH;

determining a second index value based on the first index value and a second target offset, wherein the second target offset is used to indicate an offset of a NPUSCH resource corresponding to a second candidate NPUSCH in the plurality of candidate NPUSCHs, and the second candidate NPUSCH is any one of the plurality of candidate NPUSCHs other than the first NPUSCH; and
determining a second NPUSCH indicated by the second index value as the second candidate NPUSCH.

14. The method according to claim 13, wherein determining the first index value comprises:
determining the first index value based on a frequency value corresponding to a preset subcarrier and a first target offset, wherein the preset subcarrier is a subcarrier at a starting frequency domain location of a NPUSCH used for carrying the plurality of HARQ results, and the first target offset is an offset in a frequency domain where a NPUSCH resource used for feeding back the plurality of HARQ results is located.

15. The method according to claim 14, further comprising:
receiving the starting frequency domain location sent by the base station via a first target signaling; and
receiving the first target offset sent by the base station via a second target signaling.

16. The method according to claim 13, further comprising:
receiving the second target offset sent by the base station via a second target signaling.

17. The method according to claim 12, wherein determining the combined HARQ result and the target NPUSCH in the plurality of candidate NPUSCHs based on the plurality of target HARQ results comprises:
determining the combined HARQ result and the target NPUSCH in the plurality of candidate NPUSCHs based on a preset mapping relation between target HARQ results, target NPUSCHs and combined HARQ results.

18. The method according to claim 12, further comprising:
dividing the plurality of target HARQ results into a plurality of groups of target HARQ results when a total number of the plurality of target HARQ results exceeds a preset number;
determining a preprocessed HARQ result corresponding to each of the plurality of groups of target HARQ results based on all the target HARQ results in each of the plurality of groups of target HARQ results;
determining a preprocessed combined HARQ result and the target NPUSCH in the plurality of candidate NPUSCHs based on a plurality of preprocessed HARQ results, wherein the target NPUSCH includes the target resource to carry the preprocessed combined HARQ result, and the preprocessed combined HARQ result and the target resource are used for representing the plurality of preprocessed HARQ results; and
carrying the preprocessed combined HARQ result by the target resource and sending the target NPUSCH to the base station.

19. The method according to claim 12, further comprising:
determining a target feedback time;
wherein, carrying the combined HARQ result by the target resource and sending the target NPUSCH to the base station, comprises:
carrying the combined HARQ result by the target resource and sending the target NPUSCH to the base station at the target feedback time.

20. The method according to claim 19, wherein determining the target feedback time comprises:
determining a target sub-frame, wherein the target sub-frame is a first valid sub-frame spaced from a candidate sub-frame by a specified number of sub-frames, and the candidate sub-frame is a sub-frame where a last PDSCH of the plurality of PDSCHs scheduled by the current PDCCH is located; and
determining a time at which the target sub-frame is sent as the target feedback time.

21. The method according to claim 20, further comprising:
receiving the specified number of sub-frames sent by the base station via a target signaling.

22. A hybrid automatic repeat request (HARQ) feedback apparatus, used in a Narrow Band Internet of Things (NB-IoT) device, the apparatus comprising:
a processor; and
a memory configured to store instructions executable by the processor;
wherein the processor is configured to perform the method of claim 12.

23. A hybrid automatic repeat request (HARQ) feedback apparatus, used in a Narrow Band Internet of Things (NB-IoT) device, the apparatus comprising:
a processor; and
a memory configured to store instructions executable by the processor;
wherein the processor is configured to:
determine a plurality of target HARQ results, wherein the plurality of target HARQ results correspond to a plurality of target physical downlink shared channels (PDSCHs) scheduled by a current physical downlink control channel (PDCCH);
determine a combined HARQ result based on the plurality of target HARQ results, wherein the combined HARQ result is used for representing the plurality of target HARQ results;
determine a target narrowband physical uplink shared channel NPUSCH, wherein the target NPUSCH includes a target resource carrying to carry the combined HARQ result; and
carry the combined HARQ result by the target resource and send the target NPUSCH to a base station.

* * * * *